US012479903B2

(12) United States Patent
Pezzutto et al.

(10) Patent No.: US 12,479,903 B2
(45) Date of Patent: Nov. 25, 2025

(54) CD5 SPECIFIC T CELL RECEPTOR CELL OR GENE THERAPY

(71) Applicants: MAX-DELBRÜCK-CENTRUM FÜR MOLEKULARE MEDIZIN IN DER HELMHOLTZ-GEMEINSCHAFT, Berlin (DE); CHARITÉ -UNIVERSITÄTSMEDIZIN BERLIN, Berlin (DE)

(72) Inventors: Antonio Pezzutto, Berlin (DE); Thomas Blankenstein, Berlin (DE); Nese Cakmak-Görür, Berlin (DE); Elmehdi Belbaraka, Berlin (DE)

(73) Assignees: MAX-DELBRÜCK-CENTRUM FÜR MOLEKULARE MEDIZIN IN DER HELMHOLTZ-GEMEINSCHAFT, Berlin (DE); CHARITÉ -UNIVERSITÄTSMEDIZIN BERLIN, Berlin (DE)

( * ) Notice: Subject to any disclaimer, the term of this patent is extended or adjusted under 35 U.S.C. 154(b) by 814 days.

(21) Appl. No.: 17/621,931

(22) PCT Filed: Jun. 30, 2020

(86) PCT No.: PCT/EP2020/068374
§ 371 (c)(1),
(2) Date: Dec. 22, 2021

(87) PCT Pub. No.: WO2021/001356
PCT Pub. Date: Jan. 7, 2021

(65) Prior Publication Data
US 2022/0363732 A1 Nov. 17, 2022

(30) Foreign Application Priority Data
Jul. 1, 2019 (EP) .................................... 19183694

(51) Int. Cl.
*C07K 14/725* (2006.01)
*A61K 38/00* (2006.01)
(Continued)

(52) U.S. Cl.
CPC .......... *C07K 14/7051* (2013.01); *A61K 40/11* (2025.01); *A61K 40/32* (2025.01);
(Continued)

(58) Field of Classification Search
CPC .......... C07K 114/7051; C07K 14/7051; A61K 40/4202; A61K 40/32; A61K 40/11; A61K 38/00; A61K 31/7088; C12N 15/1138; C12N 2310/14; C12N 2310/20; C12N 2740/10043; C12N 15/90
See application file for complete search history.

(56) References Cited

U.S. PATENT DOCUMENTS

2011/0142842 A1 6/2011 Olweus et al.
2017/0088895 A1 3/2017 Han
(Continued)

FOREIGN PATENT DOCUMENTS

EP 3354658 A1 * 8/2018 ......... A61K 39/0011
WO 2016/146505 9/2016
(Continued)

OTHER PUBLICATIONS

Raikar SS, Fleischer LC, Moot R, Fedanov A, Paik NY, Knight KA, Doering CB, Spencer HT. Development of chimeric antigen receptors targeting T-cell malignancies using two structurally different anti-CD5 antigen binding domains in NK and CRISPR-edited T cell lines. Oncoimmunology. Dec. 26, 2017 (Year: 2017).*
Rudolph, M. et. al. "How TCRs Bind MHCs, Peptides, and Coreceptors", 2006 Ann. Rev. Imm. vol. 24:419-446 (Year: 2006).*
Chlewicki et. al. High-affinity, Peptide-specific T Cell Receptors can be Generated by Mutations in the CDR1, CDR2, or CDR3, Journal of Mol. Biol. 2005 pp. 223-239 (Year: 2005).*
Torikai H, Reik A, Soldner F, Warren EH, et al. Toward eliminating HLA class I expression to generate universal cells from allogeneic donors. Blood. (Year: 2013).*
(Continued)

*Primary Examiner* — Anand U Desai
*Assistant Examiner* — Kathleen Cunningchen
(74) *Attorney, Agent, or Firm* — Meunier Carlin & Curfman LLC

(57) ABSTRACT

The present invention is directed to the field of immunotherapy, in particular, adoptive T cell therapy or T cell receptor (TCR) gene therapy of cancer. The invention provides nucleic acids encoding at least one TCR alpha or beta chain construct of a TCR construct capable of specifically binding to a peptide from the T-cell lineage specific antigen CD5, preferably SEQ ID NO: 1 or 33, in the context of a human MHC I such as HLA-A*02, in particular HLA-A*02: 01. The invention also provides corresponding proteins and host cells, preferably, CD8+ T cells, expressing said TCR construct. Treatment optionally is in the context of allogeneic stem cell transplantation, in particular, mismatch-transplantation, or haploidentical transplantation, or in combination with an agent capable of inhibiting expression of HLA-A*02 in the TCR-transgenic T cells. The invention thus also provides compositions and kits comprising the nucleic acids of the invention in combination with an agent capable of inhibiting expression of HLA-A*02, and, as well as the medical use of such compositions and kits. The nucleic acids, compositions and kits, proteins or host cells may be for use in the diagnosis, prevention and/or treatment of a CD5-positive T-cell lymphoma or T-cell leukemia, no matter whether the antigen is expressed on the cell surface, intracytoplasmic or in both manners.

21 Claims, 7 Drawing Sheets

Specification includes a Sequence Listing.

(51) Int. Cl.
- A61K 40/11 (2025.01)
- A61K 40/32 (2025.01)
- A61K 40/42 (2025.01)
- C12N 15/113 (2010.01)

(52) U.S. Cl.
CPC ...... *A61K 40/4202* (2025.01); *C12N 15/1138* (2013.01); *A61K 38/00* (2013.01); *C12N 2310/14* (2013.01)

(56) References Cited

U.S. PATENT DOCUMENTS

| | | | | |
|---|---|---|---|---|
| 2021/0061876 | A1* | 3/2021 | Blankenstein | C07K 14/7051 |
| 2021/0147550 | A1* | 5/2021 | Jooss | C07K 14/7051 |
| 2021/0380657 | A1* | 12/2021 | Burrows | C07K 16/085 |

FOREIGN PATENT DOCUMENTS

| | | |
|---|---|---|
| WO | 2017/158019 | 9/2017 |
| WO | 2018/115906 | 6/2018 |
| WO | 2018/138185 | 8/2018 |
| WO | 2019/112941 | 6/2019 |

OTHER PUBLICATIONS

Bunse, Mario, et al. "RNAi-mediated TCR knockdown prevents autoimmunity in mice caused by mixed TCR dimers following TCR gene transfer." Molecular Therapy 22.11 (2014): 1983-1991.

Campana, Dario, et al. "Stages of T-cell receptor protein expression in T-cell acute lymphoblastic leukemia." Blood 77.7 (1991): 1546-1554.

Chervin, Adam S., et al. "Engineering higher affinity T cell receptors using a T cell display system." Journal of immunological methods 339.2 (2008): 175-184.

D'Amore, Francesco, et al. "Final analysis of the front-line phase III randomized ACT-1 trial in younger patients with systemic peripheral T-cell lymphoma treated with CHOP chemotherapy with or without alemtuzumab and consolidated by autologous hematopoietic stem cell transplant." Blood 132 (2018): 998.

Danska, Jayne S., et al. "The presumptive CDR3 regions of both T cell receptor alpha and beta chains determine T cell specificity for myoglobin peptides." The Journal of experimental medicine 172.1 (1990): 27-33.

Garcia, K. Christopher, and Erin J. Adams. "How the T cell receptor sees antigen-a structural view." Cell 122.3 (2005): 333-336.

Gomes-Silva, Diogo, et al. "CD7-edited T cells expressing a CD7-specific CAR for the therapy of T-cell malignancies." Blood, The Journal of the American Society of Hematology 130.3 (2017): 285-296.

Lemaistre, C. F., et al. "Phase I trial of H65-RTA immunoconjugate in patients with cutaneous T-cell lymphoma." (1991): 1173-1182.

Liang, Caixia, et al. "RNAi-mediated silencing of HLA A2 suppressed acute rejection against human fibroblast xenografts in the striatum of 6-OHDA lesioned rats." Journal of Neuroimmunology 297 (2016): 28-37.

Linette, Gerald P., et al. "Cardiovascular toxicity and titin cross-reactivity of affinity-enhanced T cells in myeloma and melanoma." Blood, The Journal of the American Society of Hematology 122.6 (2013): 863-871.

Mamonkin, Maksim, et al. "A T-cell-directed chimeric antigen receptor for the selective treatment of T-cell malignancies." Blood, The Journal of the American Society of Hematology 126.8 (2015): 983-992.

Morgan, Richard A., et al. "Cancer regression and neurologic toxicity following anti-MAGE-A3 TCR gene therapy." Journal of immunotherapy (Hagerstown, Md.: 1997) 36.2 (2013): 133.

Perez-Villar, Juan J., et al. "CD5 negatively regulates the T-cell antigen receptor signal transduction pathway: involvement of SH2-containing phosphotyrosine phosphatase SHP-1." Molecular and cellular biology 19.4 (1999): 2903-2912.

Robbins, Paul F., et al. "Single and dual amino acid substitutions in TCR CDRs can enhance antigen-specific T cell functions." The Journal of Immunology 180.9 (2008): 6116-6131.

Sarhan, Mohammed A., et al. "Hepatitis C virus infection of human T lymphocytes is mediated by CD5." Journal of virology 86.7 (2012): 3723-3735.

Sommermeyer, Daniel, and Wolfgang Uckert. "Minimal amino acid exchange in human TCR constant regions fosters improved function of TCR gene-modified T cells." The Journal of Immunology 184.11 (2010): 6223-6231.

International Search Report and Written Opinion dated Aug. 18, 2020, from International Application No. PCT/EP2020/068374, 13 pages.

* cited by examiner a)
```
                    41                      70
                    |                       |
Human CD5   ---SNSKCQGQLE VYLKDGWHMV CSQSWGRSSK---
Mouse CD5   ---SNSKCQGQVE IQMENKWKTV CSSSWRLSQD---
```
(YLKDGWHMV underlined in human CD5)

b)

c)

d)

SEQUENCE LISTING

<160> NUMBER OF SEQ ID NOS: 45

<210> SEQ ID NO 1
<211> LENGTH: 9
<212> TYPE: PRT
<213> ORGANISM: Homo sapiens
<220> FEATURE:
<223> OTHER INFORMATION: epitope from CD5

<400> SEQUENCE: 1

Tyr Leu Lys Asp Gly Trp His Met Val
1               5

<210> SEQ ID NO 2
<211> LENGTH: 7
<212> TYPE: PRT
<213> ORGANISM: Homo sapiens
<220> FEATURE:
<223> OTHER INFORMATION: T-20109 + T-20332 alpha chain CDR1

<400> SEQUENCE: 2

Thr Ser Asp Pro Ser Tyr Gly
1               5

<210> SEQ ID NO 3
<211> LENGTH: 8
<212> TYPE: PRT

```
<213> ORGANISM: Homo sapiens
<220> FEATURE:
<223> OTHER INFORMATION: T-20109 + T-20332 alpha chain CDR2

<400> SEQUENCE: 3

Gln Gly Ser Tyr Asp Gln Gln Asn
1               5

<210> SEQ ID NO 4
<211> LENGTH: 15
<212> TYPE: PRT
<213> ORGANISM: Homo sapiens
<220> FEATURE:
<223> OTHER INFORMATION: T-20109 + T-20332 alpha chain CDR3

<400> SEQUENCE: 4

Ala Met Arg Glu Glu Tyr Ser Gly Ala Gly Ser Tyr Gln Leu Thr
1               5                  10                  15

<210> SEQ ID NO 5
<211> LENGTH: 5
<212> TYPE: PRT
<213> ORGANISM: Homo sapiens
<220> FEATURE:
<223> OTHER INFORMATION: T-20109 + T-20332 beta chain CDR1

<400> SEQUENCE: 5

Ser Asn His Leu Tyr
1               5

<210> SEQ ID NO 6
<211> LENGTH: 6
<212> TYPE: PRT
<213> ORGANISM: Homo sapiens
<220> FEATURE:
<223> OTHER INFORMATION: T-20109 + T-20332 beta chain CDR2

<400> SEQUENCE: 6

Phe Tyr Asn Asn Glu Ile
1               5

<210> SEQ ID NO 7
<211> LENGTH: 11
<212> TYPE: PRT
<213> ORGANISM: Artificial Sequence
<220> FEATURE:
<223> OTHER INFORMATION: beta chain CDR3 consensus sequence
<220> FEATURE:
<221> NAME/KEY: VARIANT
<222> LOCATION: 4
<223> OTHER INFORMATION: Xaa can be any naturally occurring amino acid

<400> SEQUENCE: 7

Ala Ser Ser Xaa Gly Pro Tyr Asn Glu Gln Phe
1               5                  10

<210> SEQ ID NO 8
<211> LENGTH: 11
<212> TYPE: PRT
<213> ORGANISM: Homo sapiens

<400> SEQUENCE: 8

Ala Ser Ser Gln Gly Pro Tyr Asn Glu Gln Phe
1               5                  10

<210> SEQ ID NO 9
<211> LENGTH: 11
```

-continued

<212> TYPE: PRT
<213> ORGANISM: Homo sapiens
<220> FEATURE:
<223> OTHER INFORMATION: T-20332 beta chain CDR3

<400> SEQUENCE: 9

Ala Ser Ser Arg Gly Pro Tyr Asn Glu Gln Phe
1               5                   10

<210> SEQ ID NO 10
<211> LENGTH: 138
<212> TYPE: PRT
<213> ORGANISM: Homo sapiens
<220> FEATURE:
<223> OTHER INFORMATION: variable region T-20109 alpha chain (aa)

<400> SEQUENCE: 10

Met Ser Leu Ser Ser Leu Leu Lys Val Val Thr Ala Ser Leu Trp Leu
1               5                   10                  15

Gly Pro Gly Ile Ala Gln Lys Ile Thr Gln Thr Gln Pro Gly Met Phe
            20                  25                  30

Val Gln Glu Lys Glu Ala Val Thr Leu Asp Cys Thr Tyr Asp Thr Ser
        35                  40                  45

Asp Pro Ser Tyr Gly Leu Phe Trp Tyr Lys Gln Pro Ser Ser Gly Glu
    50                  55                  60

Met Ile Phe Leu Ile Tyr Gln Gly Ser Tyr Asp Gln Gln Asn Ala Thr
65                  70                  75                  80

Glu Gly Arg Tyr Ser Leu Asn Phe Gln Lys Ala Arg Lys Ser Ala Asn
                85                  90                  95

Leu Val Ile Ser Ala Ser Gln Leu Gly Asp Ser Ala Met Tyr Phe Cys
            100                 105                 110

Ala Met Arg Glu Glu Tyr Ser Gly Ala Gly Ser Tyr Gln Leu Thr Phe
        115                 120                 125

Gly Lys Gly Thr Lys Leu Ser Val Ile Pro
    130                 135

<210> SEQ ID NO 11
<211> LENGTH: 132
<212> TYPE: PRT
<213> ORGANISM: Homo sapiens
<220> FEATURE:
<223> OTHER INFORMATION: variable region T-20109 beta chain(aa)

<400> SEQUENCE: 11

Met Asp Thr Trp Leu Val Cys Trp Ala Ile Phe Ser Leu Leu Lys Ala
1               5                   10                  15

Gly Leu Thr Glu Pro Glu Val Thr Gln Thr Pro Ser His Gln Val Thr
            20                  25                  30

Gln Met Gly Gln Glu Val Ile Leu Arg Cys Val Pro Ile Ser Asn His
        35                  40                  45

Leu Tyr Phe Tyr Trp Tyr Arg Gln Ile Leu Gly Gln Lys Val Glu Phe
    50                  55                  60

Leu Val Ser Phe Tyr Asn Asn Glu Ile Ser Glu Lys Ser Glu Ile Phe
65                  70                  75                  80

Asp Asp Gln Phe Ser Val Glu Arg Pro Asp Gly Ser Asn Phe Thr Leu
                85                  90                  95

Lys Ile Arg Ser Thr Lys Leu Glu Asp Ser Ala Met Tyr Phe Cys Ala
            100                 105                 110

Ser Ser Gln Gly Pro Tyr Asn Glu Gln Phe Phe Gly Pro Gly Thr Arg

Leu Thr Val Leu
    130

<210> SEQ ID NO 12
<211> LENGTH: 138
<212> TYPE: PRT
<213> ORGANISM: Homo sapiens
<220> FEATURE:
<223> OTHER INFORMATION: variable region T-20332 alpha chain (aa)

<400> SEQUENCE: 12

Met Ser Leu Ser Ser Leu Leu Lys Val Val Thr Ala Ser Leu Trp Leu
1               5                   10                  15

Gly Pro Gly Ile Ala Gln Lys Ile Thr Gln Thr Gln Pro Gly Met Phe
            20                  25                  30

Val Gln Glu Lys Glu Ala Val Thr Leu Asp Cys Thr Tyr Asp Thr Ser
        35                  40                  45

Asp Pro Ser Tyr Gly Leu Phe Trp Tyr Lys Gln Pro Ser Ser Gly Glu
    50                  55                  60

Met Ile Phe Leu Ile Tyr Gln Gly Ser Tyr Asp Gln Gln Asn Ala Thr
65                  70                  75                  80

Glu Gly Arg Tyr Ser Leu Asn Phe Gln Lys Ala Arg Lys Ser Ala Asn
                85                  90                  95

Leu Val Ile Ser Ala Ser Gln Leu Gly Asp Ser Ala Met Tyr Phe Cys
            100                 105                 110

Ala Met Arg Glu Glu Tyr Ser Gly Ala Gly Ser Tyr Gln Leu Thr Phe
        115                 120                 125

Gly Lys Gly Thr Lys Leu Ser Val Ile Pro
    130                 135

<210> SEQ ID NO 13
<211> LENGTH: 132
<212> TYPE: PRT
<213> ORGANISM: Homo sapiens
<220> FEATURE:
<223> OTHER INFORMATION: variable region T-20332 beta chain (aa)

<400> SEQUENCE: 13

Met Asp Thr Trp Leu Val Cys Trp Ala Ile Phe Ser Leu Leu Lys Ala
1               5                   10                  15

Gly Leu Thr Glu Pro Glu Val Thr Gln Thr Pro Ser His Gln Val Thr
            20                  25                  30

Gln Met Gly Gln Glu Val Ile Leu Arg Cys Val Pro Ile Ser Asn His
        35                  40                  45

Leu Tyr Phe Tyr Trp Tyr Arg Gln Ile Leu Gly Gln Lys Val Glu Phe
    50                  55                  60

Leu Val Ser Phe Tyr Asn Asn Glu Ile Ser Glu Lys Ser Glu Ile Phe
65                  70                  75                  80

Asp Asp Gln Phe Ser Val Glu Arg Pro Asp Gly Ser Asn Phe Thr Leu
                85                  90                  95

Lys Ile Arg Ser Thr Lys Leu Glu Asp Ser Ala Met Tyr Phe Cys Ala
            100                 105                 110

Ser Ser Arg Gly Pro Tyr Asn Glu Gln Phe Phe Gly Pro Gly Thr Arg
        115                 120                 125

Leu Thr Val Leu
    130

<210> SEQ ID NO 14
<211> LENGTH: 414
<212> TYPE: DNA
<213> ORGANISM: Artificial Sequence
<220> FEATURE:
<223> OTHER INFORMATION: variable region T-20109 alpha chain (na) (codon optimized)

<400> SEQUENCE: 14

```
atgtctctgt cctctctgct gaaagtggtc accgccagcc tgtggctcgg acctggaatt      60
gcccagaaga tcacccagac acagcccggc atgttcgtgc aagagaaaga agccgtgaca     120
ctggactgca cctacgacac cagcgatcct agctacggct gttctggta caagcagcct      180
agcagcggcg agatgatctt cctgatctac cagggcagct acgaccagca gaacgccaca     240
gagggcagat acagcctgaa cttccagaag gcccggaagt ccgccaacct ggtcatttct     300
gctagccagc tgggcgactc cgccatgtat ttctgtgcca tgcgggaaga gtacagcgga     360
gccggaagct accagctgac atttggcaag ggcacaaagc tgagcgtgat cccc           414
```

<210> SEQ ID NO 15
<211> LENGTH: 396
<212> TYPE: DNA
<213> ORGANISM: Artificial Sequence
<220> FEATURE:
<223> OTHER INFORMATION: variable region T-20109 beta chain (na) (codon optimized)

<400> SEQUENCE: 15

```
atggatactt ggcttgtgtg ctgggccatc ttcagcctgc tgaaggccgg actgacagag      60
cccgaagtga cacagacacc cagccaccaa gtgacccaga tgggccaaga agtgatcctg     120
cgctgcgtgc ccatcagcaa ccacctgtac ttctactggt acagacagat cctgggccag     180
aaagtcgagt tcctggtgtc cttctacaac aacgagatca gcgagaagtc cgagatcttc     240
gacgaccagt tcagcgtgga aagacccgac ggcagcaact tcaccctgaa gatcagaagc     300
accaagctcg aggacagcgc catgtacttt tgcgcctctt ctcagggccc ctacaacgag     360
cagttttttcg gccctggcac cagactgacc gtgctg                                396
```

<210> SEQ ID NO 16
<211> LENGTH: 414
<212> TYPE: DNA
<213> ORGANISM: Homo sapiens
<220> FEATURE:
<223> OTHER INFORMATION: variable region T-20332 alpha chain (na)

<400> SEQUENCE: 16

```
atgtctctgt cctctctgct gaaagtggtc accgccagcc tgtggctcgg acctggaatt      60
gcccagaaga tcacccagac acagcccggc atgttcgtgc aagagaaaga agccgtgaca     120
ctggactgca cctacgacac cagcgatcct agctacggcc tgttctggta caagcagcct     180
agcagcggcg agatgatctt cctgatctac cagggcagct acgaccagca gaacgccaca     240
gagggcagat acagcctgaa cttccagaag gcccggaagt ccgccaacct ggtcatttct     300
gctagccagc tgggcgactc cgccatgtat ttctgtgcca tgcgggaaga gtacagcgga     360
gccggaagct accagctgac atttggcaag ggcacaaagc tgagcgtgat cccc           414
```

<210> SEQ ID NO 17
<211> LENGTH: 396
<212> TYPE: DNA
<213> ORGANISM: Homo sapiens

```
<220> FEATURE:
<223> OTHER INFORMATION: variable region T-20332 beta chain (na)

<400> SEQUENCE: 17
atggatactt ggcttgtgtg ctgggccatc ttcagcctgc tgaaggccgg actgacagag      60
cccgaagtga cacagacacc cagccaccaa gtgacccaga tgggccaaga agtgatcctg     120
cgctgcgtgc ccatcagcaa ccacctgtac ttctactggt acagacagat cctgggccag     180
aaagtcgagt tcctggtgtc cttctacaac aacgagatca gcgagaagtc cgagatcttc     240
gacgaccagt tcagcgtgga agacccgac ggcagcaact tcaccctgaa gatcagaagc      300
accaagctcg aggacagcgc catgtacttt tgcgcctctt ctagaggccc ctacaacgag     360 cagttttcg gccctggcac cagactgacc gtgctg                                 396

<210> SEQ ID NO 18
<211> LENGTH: 136
<212> TYPE: PRT
<213> ORGANISM: Mus musculus
<220> FEATURE:
<223> OTHER INFORMATION: murine constant region (alpha chain)

<400> SEQUENCE: 18

Ile Gln Asn Pro Glu Pro Ala Val Tyr Gln Leu Lys Asp Pro Arg Ser
1               5                   10                  15

Gln Asp Ser Thr Leu Cys Leu Phe Thr Asp Phe Asp Ser Gln Ile Asn
            20                  25                  30

Val Pro Lys Thr Met Glu Ser Gly Thr Phe Ile Thr Asp Lys Thr Val
        35                  40                  45

Leu Asp Met Lys Ala Met Asp Ser Lys Ser Asn Gly Ala Ile Ala Trp
    50                  55                  60

Ser Asn Gln Thr Ser Phe Thr Cys Gln Asp Ile Phe Lys Glu Thr Asn
65                  70                  75                  80

Ala Thr Tyr Pro Ser Ser Asp Val Pro Cys Asp Ala Thr Leu Thr Glu
                85                  90                  95

Lys Ser Phe Glu Thr Asp Met Asn Leu Asn Phe Gln Asn Leu Ser Val
            100                 105                 110

Met Gly Leu Arg Ile Leu Leu Leu Lys Val Ala Gly Phe Asn Leu Leu
        115                 120                 125

Met Thr Leu Arg Leu Trp Ser Ser
    130                 135

<210> SEQ ID NO 19
<211> LENGTH: 140
<212> TYPE: PRT
<213> ORGANISM: Mus musculus
<220> FEATURE:
<223> OTHER INFORMATION: minimally murine constant region (alpha chain)

<400> SEQUENCE: 19

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Thr Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
```

```
                65                  70                  75                  80
Ile Pro Glu Asp Thr Phe Phe Pro Ser Ser Asp Val Pro Cys Asp Val
                        85                  90                  95

Lys Leu Val Glu Lys Ser Phe Glu Thr Asp Thr Asn Leu Asn Phe Gln
                        100                 105                 110

Asn Leu Ser Val Ile Gly Phe Arg Ile Leu Leu Leu Lys Val Ala Gly
                        115                 120                 125

Phe Asn Leu Leu Met Thr Leu Arg Leu Trp Ser Ser
                        130                 135                 140

<210> SEQ ID NO 20
<211> LENGTH: 140
<212> TYPE: PRT
<213> ORGANISM: Homo sapiens
<220> FEATURE:
<223> OTHER INFORMATION: human constant region (alpha chain)

<400> SEQUENCE: 20

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
                20                  25                  30

Val Ser Gln Ser Lys Asp Ser Asp Val Tyr Ile Thr Asp Lys Thr Val
                35                  40                  45

Leu Asp Met Arg Ser Met Asp Phe Lys Ser Asn Ser Ala Val Ala Trp
        50                  55                  60

Ser Asn Lys Ser Asp Phe Ala Cys Ala Asn Ala Phe Asn Asn Ser Ile
65                  70                  75                  80

Ile Pro Glu Asp Thr Phe Phe Pro Ser Pro Glu Ser Ser Cys Asp Val
                        85                  90                  95

Lys Leu Val Glu Lys Ser Phe Glu Thr Asp Thr Asn Leu Asn Phe Gln
                        100                 105                 110

Asn Leu Ser Val Ile Gly Phe Arg Ile Leu Leu Leu Lys Val Ala Gly
                        115                 120                 125

Phe Asn Leu Leu Met Thr Leu Arg Leu Trp Ser Ser
                        130                 135                 140

<210> SEQ ID NO 21
<211> LENGTH: 173
<212> TYPE: PRT
<213> ORGANISM: Mus musculus
<220> FEATURE:
<223> OTHER INFORMATION: murine constant region (beta)

<400> SEQUENCE: 21

Glu Asp Leu Arg Asn Val Thr Pro Pro Lys Val Ser Leu Phe Glu Pro
1               5                   10                  15

Ser Lys Ala Glu Ile Ala Asn Lys Gln Lys Ala Thr Leu Val Cys Leu
                20                  25                  30

Ala Arg Gly Phe Phe Pro Asp His Val Glu Leu Ser Trp Trp Val Asn
                35                  40                  45

Gly Lys Glu Val His Ser Gly Val Ser Thr Asp Pro Gln Ala Tyr Lys
        50                  55                  60

Glu Ser Asn Tyr Ser Tyr Cys Leu Ser Ser Arg Leu Arg Val Ser Ala
65                  70                  75                  80

Thr Phe Trp His Asn Pro Arg Asn His Phe Arg Cys Gln Val Gln Phe
                        85                  90                  95
```

His Gly Leu Ser Glu Asp Lys Trp Pro Glu Gly Ser Pro Lys Pro
            100                 105                 110

Val Thr Gln Asn Ile Ser Ala Glu Ala Trp Gly Arg Ala Asp Cys Gly
            115                 120                 125

Ile Thr Ser Ala Ser Tyr His Gln Gly Val Leu Ser Ala Thr Ile Leu
            130                 135                 140

Tyr Glu Ile Leu Leu Gly Lys Ala Thr Leu Tyr Ala Val Leu Val Ser
145                 150                 155                 160

Gly Leu Val Leu Met Ala Met Val Lys Lys Lys Asn Ser
                165                 170

<210> SEQ ID NO 22
<211> LENGTH: 179
<212> TYPE: PRT
<213> ORGANISM: Artificial Sequence
<220> FEATURE:
<223> OTHER INFORMATION: minimally murine constant region (beta chain)

<400> SEQUENCE: 22

Glu Asp Leu Lys Asn Val Phe Pro Pro Lys Val Ala Val Phe Glu Pro
1               5                   10                  15

Ser Lys Ala Glu Ile Ala His Thr Gln Lys Ala Thr Leu Val Cys Leu
            20                  25                  30

Ala Thr Gly Phe Tyr Pro Asp His Val Glu Leu Ser Trp Trp Val Asn
        35                  40                  45

Gly Lys Glu Val His Ser Gly Val Ser Thr Asp Pro Gln Pro Leu Lys
    50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
            115                 120                 125

Ala Asp Cys Gly Ile Thr Ser Ala Ser Tyr His Gln Gly Val Leu Ser
        130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Ser Arg Gly

<210> SEQ ID NO 23
<211> LENGTH: 179
<212> TYPE: PRT
<213> ORGANISM: Homo sapiens
<220> FEATURE:
<223> OTHER INFORMATION: human constant region (beta chain)

<400> SEQUENCE: 23

Glu Asp Leu Lys Asn Val Phe Pro Pro Lys Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Tyr Pro Asp His Val Glu Leu Ser Trp Trp Val Asn
        35                  40                  45

Gly Lys Glu Val His Ser Gly Val Ser Thr Asp Pro Gln Pro Leu Lys
            50                  55                  60

Glu Gln Pro Ala Leu Asn Asp Ser Arg Tyr Cys Leu Ser Ser Arg Leu
 65                  70                  75                  80

Arg Val Ser Ala Thr Phe Trp Gln Asn Pro Arg Asn His Phe Arg Cys
                 85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
            115                 120                 125

Ala Asp Cys Gly Phe Thr Ser Glu Ser Tyr Gln Gln Gly Val Leu Ser
            130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Ser Arg Gly

<210> SEQ ID NO 24
<211> LENGTH: 29
<212> TYPE: DNA
<213> ORGANISM: Artificial Sequence
<220> FEATURE:
<223> OTHER INFORMATION: reverse primer for TCRA

<400> SEQUENCE: 24
cggccacttt caggaggagg attcggacc                                    29

<210> SEQ ID NO 25
<211> LENGTH: 30
<212> TYPE: DNA
<213> ORGANISM: Artificial Sequence
<220> FEATURE:
<223> OTHER INFORMATION: reverse primer for TCRB

<400> SEQUENCE: 25
ccgtagaact ggacttgaca gcggaagtgg                                   30

<210> SEQ ID NO 26
<211> LENGTH: 30
<212> TYPE: PRT
<213> ORGANISM: Homo sapiens
<220> FEATURE:
<223> OTHER INFORMATION: sequence from human CD5 (Fig. 1a)

<400> SEQUENCE: 26

Ser Asn Ser Lys Cys Gln Gly Gln Leu Glu Val Tyr Leu Lys Asp Gly
 1               5                  10                  15

Trp His Met Val Cys Ser Gln Ser Trp Gly Arg Ser Ser Lys
                 20                  25                  30

<210> SEQ ID NO 27
<211> LENGTH: 30
<212> TYPE: PRT
<213> ORGANISM: Mus musculus
<220> FEATURE:
<223> OTHER INFORMATION: sequence from mouse CD5 (Fig. 1b)

<400> SEQUENCE: 27

Ser Asn Ser Lys Cys Gln Gly Gln Val Glu Ile Gln Met Glu Asn Lys
 1               5                  10                  15

Trp Lys Thr Val Cys Ser Ser Ser Trp Arg Leu Ser Gln Asp
                20                  25                  30

<210> SEQ ID NO 28
<211> LENGTH: 20
<212> TYPE: DNA
<213> ORGANISM: Artificial Sequence
<220> FEATURE:
<223> OTHER INFORMATION: crRNA-spacer A2-1

<400> SEQUENCE: 28
catggagtga gagcccgccc                                                   20

<210> SEQ ID NO 29
<211> LENGTH: 20
<212> TYPE: DNA
<213> ORGANISM: Artificial Sequence
<220> FEATURE:
<223> OTHER INFORMATION: crRNA-spacer A2-2

<400> SEQUENCE: 29
cctctggacg gtgtgagaac                                                   20

<210> SEQ ID NO 30
<211> LENGTH: 19
<212> TYPE: DNA
<213> ORGANISM: Artificial Sequence
<220> FEATURE:
<223> OTHER INFORMATION: crRNA-spacer A2-3

<400> SEQUENCE: 30
cggggagaca cggaaagtg                                                    19

<210> SEQ ID NO 31
<211> LENGTH: 20
<212> TYPE: DNA
<213> ORGANISM: Artificial Sequence
<220> FEATURE:
<223> OTHER INFORMATION: crRNA-spacer A2-4

<400> SEQUENCE: 31
aggcgtactg gtggtacccg                                                   20

<210> SEQ ID NO 32
<211> LENGTH: 20
<212> TYPE: DNA
<213> ORGANISM: Artificial Sequence
<220> FEATURE:
<223> OTHER INFORMATION: crRNA-spacer A2-5

<400> SEQUENCE: 32
tgccgtcgta ggcgtactgg                                                   20

<210> SEQ ID NO 33
<211> LENGTH: 9
<212> TYPE: PRT
<213> ORGANISM: Homo sapiens
<220> FEATURE:
<223> OTHER INFORMATION: epitope from CD5

<400> SEQUENCE: 33

Ser Ile Cys Glu Gly Thr Val Glu Val
1               5

<210> SEQ ID NO 34
<211> LENGTH: 7

```
<212> TYPE: PRT
<213> ORGANISM: Homo sapiens
<220> FEATURE:
<223> OTHER INFORMATION: T-7378 alpha chain CDR1

<400> SEQUENCE: 34

Thr Ser Glu Ser Asp Tyr Tyr
1               5

<210> SEQ ID NO 35
<211> LENGTH: 8
<212> TYPE: PRT
<213> ORGANISM: Homo sapiens
<220> FEATURE:
<223> OTHER INFORMATION: T-7378 alpha chain CDR2

<400> SEQUENCE: 35

Gln Glu Ala Tyr Lys Gln Gln Asn
1               5

<210> SEQ ID NO 36
<211> LENGTH: 12
<212> TYPE: PRT
<213> ORGANISM: Homo sapiens
<220> FEATURE:
<223> OTHER INFORMATION: T-7378 alpha chain CDR3

<400> SEQUENCE: 36

Ala Tyr Arg Gly Thr Ser Gly Thr Tyr Lys Tyr Ile
1               5                   10

<210> SEQ ID NO 37
<211> LENGTH: 5
<212> TYPE: PRT
<213> ORGANISM: Homo sapiens
<220> FEATURE:
<223> OTHER INFORMATION: T-7378 beta chain CDR1

<400> SEQUENCE: 37

Met Gly His Arg Ala
1               5

<210> SEQ ID NO 38
<211> LENGTH: 6
<212> TYPE: PRT
<213> ORGANISM: Homo sapiens
<220> FEATURE:
<223> OTHER INFORMATION: T-7378 beta chain CDR2

<400> SEQUENCE: 38

Tyr Ser Tyr Glu Lys Leu
1               5

<210> SEQ ID NO 39
<211> LENGTH: 13
<212> TYPE: PRT
<213> ORGANISM: Homo sapiens
<220> FEATURE:
<223> OTHER INFORMATION: T-7378 beta chain CDR3

<400> SEQUENCE: 39

Ala Ser Ser Arg Gly Leu Ala Gly Pro Tyr Glu Gln Tyr
1               5                   10

<210> SEQ ID NO 40
<211> LENGTH: 136
<212> TYPE: PRT
```

<213> ORGANISM: Homo sapiens
<220> FEATURE:
<223> OTHER INFORMATION: variable region T-7378 alpha chain (aa)

<400> SEQUENCE: 40

Met Ala Cys Pro Gly Phe Leu Trp Ala Leu Val Ile Ser Thr Cys Leu
1               5                   10                  15

Glu Phe Ser Met Ala Gln Thr Val Thr Gln Ser Gln Pro Glu Met Ser
            20                  25                  30

Val Gln Glu Ala Glu Thr Val Thr Leu Ser Cys Thr Tyr Asp Thr Ser
        35                  40                  45

Glu Ser Asp Tyr Tyr Leu Phe Trp Tyr Lys Gln Pro Pro Ser Arg Gln
    50                  55                  60

Met Ile Leu Val Ile Arg Gln Glu Ala Tyr Lys Gln Gln Asn Ala Thr
65                  70                  75                  80

Glu Asn Arg Phe Ser Val Asn Phe Gln Lys Ala Ala Lys Ser Phe Ser
                85                  90                  95

Leu Lys Ile Ser Asp Ser Gln Leu Gly Asp Ala Ala Met Tyr Phe Cys
            100                 105                 110

Ala Tyr Arg Gly Thr Ser Gly Thr Tyr Lys Tyr Ile Phe Gly Thr Gly
        115                 120                 125

Thr Met Leu Lys Val Leu Ala Asn
    130                 135

<210> SEQ ID NO 41
<211> LENGTH: 133
<212> TYPE: PRT
<213> ORGANISM: Homo sapiens
<220> FEATURE:
<223> OTHER INFORMATION: variable region T-7378 beta chain (aa)

<400> SEQUENCE: 41

Met Gly Cys Arg Leu Leu Cys Cys Ala Val Leu Cys Leu Leu Gly Ala
1               5                   10                  15

Val Pro Ile Asp Thr Glu Val Thr Gln Thr Pro Lys His Leu Val Met
            20                  25                  30

Gly Met Thr Asn Lys Lys Ser Leu Lys Cys Glu Gln His Met Gly His
        35                  40                  45

Arg Ala Met Tyr Trp Tyr Lys Gln Lys Ala Lys Lys Pro Pro Glu Leu
    50                  55                  60

Met Phe Val Tyr Ser Tyr Glu Lys Leu Ser Ile Asn Glu Ser Val Pro
65                  70                  75                  80

Ser Arg Phe Ser Pro Glu Cys Pro Asn Ser Ser Leu Leu Asn Leu His
                85                  90                  95

Leu His Ala Leu Gln Pro Glu Asp Ser Ala Leu Tyr Leu Cys Ala Ser
            100                 105                 110

Ser Arg Gly Leu Ala Gly Pro Tyr Glu Gln Tyr Phe Gly Pro Gly Thr
        115                 120                 125

Arg Leu Thr Val Thr
    130

<210> SEQ ID NO 42
<211> LENGTH: 408
<212> TYPE: DNA
<213> ORGANISM: Homo sapiens
<220> FEATURE:
<223> OTHER INFORMATION: variable region T-7378 alpha chain (na)

<400> SEQUENCE: 42

```
atggcatgcc ctggcttcct gtgggcactt gtgatctcca cctgtcttga atttagcatg      60
gctcagacag tcactcagtc tcaaccagag atgtctgtgc aggaggcaga gaccgtgacc     120
ctgagctgca catatgacac cagtgagagt gattattatt tattctggta caagcagcct     180
cccagcaggc agatgattct cgttattcgc caagaagctt ataagcaaca gaatgcaaca     240
gagaatcgtt tctctgtgaa cttccagaaa gcagccaaat ccttcagtct caagatctca     300
gactcacagc tgggggatgc cgcgatgtat ttctgtgctt atagggggtac ctcaggaacc     360 tacaaataca tctttggaac aggcaccatg ctgaaggttt tagcaaat               408
```

<210> SEQ ID NO 43
<211> LENGTH: 399
<212> TYPE: DNA
<213> ORGANISM: Homo sapiens
<220> FEATURE:
<223> OTHER INFORMATION: variable region T-7378 beta chain (na)

<400> SEQUENCE: 43

```
atgggctgca ggctgctctg ctgtgcggtt ctctgtctcc tgggagcagt tcccatagac      60
actgaagtta cccagacacc aaaacacctg gtcatgggaa tgacaaataa gaagtctttg     120
aaatgtgaac aacatatggg gcacagggct atgtattggt acaagcagaa agctaagaag     180
ccaccggagc tcatgtttgt ctacagctat gagaaactct ctataaatga agtgtgcca      240 agtcgcttct cacctgaatg ccccaacagc tctctcttaa accttcacct acacgccctg     300
cagccagaag actcagccct gtatctctgc gccagcagcc gcggactagc gggaccctac     360
gagcagtact cgggccgggg caccaggctc acggtcaca                          399
```

<210> SEQ ID NO 44
<211> LENGTH: 408
<212> TYPE: DNA
<213> ORGANISM: Artificial Sequence
<220> FEATURE:
<223> OTHER INFORMATION: variable region T-7378 alpha chain (na) (codon
      optimized)

<400> SEQUENCE: 44

```
atggcctgtc caggatttct gtgggccctc gtgatcagca cctgtctcga gtttagcatg      60
gcccagaccg tgacacagtc ccagcctgag atgtctgtgc aagaggccga gacagtgacc     120
ctgagctgca cctacgatac cagcgagagc gactactacc tgttctggta taagcagcct     180
cctagccggc agatgatcct ggtcatcaga caagaggctt acaagcagca gaacgccaca     240
gagaaccgct tcagcgtgaa cttccagaag gccgccaaga gctttagcct gaaaatcagc     300
gacagccagc tgggcgacgc cgccatgtat ttctgtgcct acagaggcac cagcggcacc     360
tacaagtaca tctttggcac cggcacaatg ctgaaggtgc tggccaat                408
```

<210> SEQ ID NO 45
<211> LENGTH: 399
<212> TYPE: DNA
<213> ORGANISM: Artificial Sequence
<220> FEATURE:
<223> OTHER INFORMATION: variable region T-7378 beta chain (na) (codon
      optimized)

<400> SEQUENCE: 45

```
atgggatgta gactgctgtg ttgtgccgtg ctgtgtctgc tgggagccgt gcctatcgac      60
accgaagtga cccagacacc taagcacctg gtcatgggca tgacaaacaa gaaaagcctg     120
```

-continued

```
aagtgcgagc agcacatggg ccacagagcc atgtactggt acaagcagaa ggccaagaaa      180
cctcctgagc tgatgttcgt gtacagctac gagaagctga gcatcaacga gagcgtgccc      240
agcagattca gccctgagtg ccctaatagc agcctgctga acctgcatct gcacgccctg      300
cagcctgaag atagcgccct gtatctgtgc gccagctcta gaggactggc cggaccttac      360
gagcagtact ttggccctgg caccagactg accgtgacc                             399
```

CD5 SPECIFIC T CELL RECEPTOR CELL OR GENE THERAPY

CD5 Specific T Cell Receptor Cell or Gene Therapy

The present invention is directed to the field of immunotherapy, in particular, adoptive T cell therapy or T cell receptor (TCR) gene therapy of cancer. The invention provides nucleic acids encoding at least one TCR alpha or beta chain construct of a TCR construct capable of specifically binding to a peptide from the T-cell lineage specific antigen CD5, preferably SEQ ID NO: 33 or SEQ ID NO: 1, in the context of a human MHC I such as HLA-A*02, in particular HLA-A*02:01. The invention also provides corresponding proteins and host cells, preferably, CD8+ T cells, expressing said TCR construct. Treatment optionally is in the context of allogeneic stem cell transplantation, in particular, mismatch-transplantation, or haploidentical transplantation, or in combination with an agent capable of inhibiting expression of HLA-A*02 and/or CD5 in the TCR-transgenic T cells. The invention thus also provides compositions and kits comprising the nucleic acids of the invention in combination with an agent capable of inhibiting expression of HLA-A*02 and/or CD5, as well as the medical use of such compositions and kits. The nucleic acids, compositions and kits, proteins or host cells may be for use in the diagnosis, prevention and/or treatment of a CD5-positive T-cell lymphoma or T-cell leukemia, no matter whether the antigen is expressed on the cell surface, intracytoplasmic or in both manners.

T-cell derived neoplasms make up for about 20% of all lymphoid malignancies (including lymphomas and leukemias), with relatively high regional variations (high incidence of some entities in South-East Asia). In the USA, around 4.000-6.000 new T-cell lymphomas are observed each year. The incidence of T/NK (natural-Killer)-tumors is about 2/100.000 people in Europe, accounting for around 10.000-12.000 new cases in the European countries. The most frequent T-cell lymphomas include Peripheral T-Cell Lymphoma—Not Otherwise Specified (PTCL-NOS), Anaplastic Large Cell Lymphoma (ALCL), Angioimmunoblastic T-Cell Lymphoma (AITL), Cutaneous T-Cell Lymphoma (CTCL), Adult T-Cell Leukemia/Lymphoma (ATLL), Enteropathy-Type T-Cell Lymphoma, Hepatosplenic Gamma-Delta T-Cell Lymphoma, Lymphoblastic Lymphoma, Nasal NK/T-Cell Lymphoma, and some other rarer entities. The 5-year cure rate is only about 40% with strong variation among the different subentities: the subgroup of "cutaneous T-cell lymphomas", such as Mycosis Fungoides and Sezary Syndrome, (accounting for 4% of all lymphomas) has a moderately better prognosis with a more chronic course with initial high remission rates and sometimes prolonged responses to different therapies.

Most patients with T-cell lymphomas/leukemias will not be cured by chemotherapy. The cure rate ranges from below 10% (entheropathy associated T-cell lymphoma) to 60% (angioimmunoblastic lymphoma). Currently the only immunotherapy available for T cell malignancies is the immunoconjugate Brentuximab-Vedotin addressing the CD30 antigen that is expressed in a small fraction of T-cell lymphomas and leukemias. This drug has shown modest improvement over chemotherapy alone when used in combination with chemotherapy. Most patients with T-cell neoplasms will relapse after initial standard therapy or will not respond at all. When the disease relapses or progresses without ever responding, there is hardly any therapeutic option, even allogeneic stem cell transplantation has a low cure rate of only 30 to 40% in the small group of patients that are suitable for it (younger patients, typically below 50-55 y., in good clinical conditions, because of age and disease-related morbidity conditions). This all indicates an urgent need for alternative treatment options. Lymphoma incidence steeply increases with age, and for many patients aged 75 or more the prognosis is even worse, since the aggressive chemotherapy combinations used have a higher morbidity and mortality in such patients as compared to the younger population.

Given the chemoresistance to conventional drugs, most patients with T-cell lymphomas are considered for first-line high-dose chemotherapy with stem cell rescue if younger than 60 years of age, so that around half of the patients will receive this treatment. For most of the remaining patients, chemotherapy is palliative, leading only to temporary remissions and finally to death. However, even in the group of patients aggressively treated with "first-line" high-dose chemotherapy and autologous stem cell transplantation, around 50% of the patients will relapse. Some centers consider allogeneic stem cell transplantation as a first line option for patients with T-cell lymphoma, but the morbidity and mortality of the treatment is high, and the risk of relapse still high, with success rates of only about 40%.

Patients with relapsed or primarily refractory T-cell lymphoma hardly have any option for cure: the disease is normally fatal within a few months. Effective antibodies (such as anti-CD20 Rituximab for B-cell leukemias/lymphomas) are not available in T-cell malignancies. The aforementioned CD30 antigen is expressed only in a minority of T-cell lymphomas, and an antibody against the CD52 antigen has shown minimal activity in randomized studies (D' Amore et al.. ASH 2018).

CARs are chimeras of the antigen-binding domains of antibodies capable of recognizing cell surface antigens combined with TCR domains. T cells engineered to express the CAR thus target cells expressing the antigen to which the CAR binds, irrespective of any HLA restriction. For example, CAR T-cells targeting B-cell antigens have proven successful, demonstrating the potency of adoptive T-cell therapy. Recently, clinical studies of adoptive T-cell therapy (ATT) using chimeric antigenic receptors gene-transfer against the B-cell antigen CD19 have achieved remarkable success in 40-70% of patients with B-cell lymphomas or leukemias, and the therapy been designated as "breakthrough cancer therapy". Several groups are developing this strategy, mainly by targeting B-cell lineage antigens such as CD19, CD20 and CD22.

CAR-strategies for T-cell malignancies have long been neglected because of the "fratricidal" effect that occurs when engineering T-cells with a receptor directed against a T-cell antigens: T-cells will kill each other.

CD5 is a validated target antigen strongly expressed on T cells, where it appears to negatively modulate the function of the T cell receptor (Perez-Villar et al. 1999, Mol Cell Biol 19(4):2903-2912). Around 80% of T-cell lymphomas and leukemias express CD5 (Campana et al. 1991, Blood 77(7): 1546-1554), but also a minority of B-cell lymphomas aberrantly expresses CD5. Immunotoxins based on CD5 were used in early clinical trials with good safety profile and some moderate responses, but, like most immunotoxins, were soon abandoned because of the short duration of responses (LeMaistre et al. 1991 Blood 78(5):1173-1182).

Despite the potential problem of fratricidal killing, recently efforts have been put to develop a CAR T cell therapy for T cell leukemia/lymphomas by using a CD5 specific antibody fragment as part of the Chimeric antigen receptor (Mamonkin et al., 2015, Blood 126(8):983-992). Surprisingly, fratricidal killing by gene-modified, CD5-CAR expressing T cells was limited, because of downregulation of CD5 expression from the cell surface as results of interaction of the antigen with the antibody portion of the CARs. Although CD5 CARs effectively killed T-ALL and T-cell lymphoma lines in vitro and tumor growth delay was initially seen in a xenogeneic T-ALL murine model, most tumors relapsed: CAR-CD5 expressing T cells did not proliferate and expand sufficiently, and concerns exist that downregulation of CD5 expression would prevent long term success of the strategy in patients. The same group of researchers at Baylors College of Medicine and Texas Children Hospital has switched to CD7 CAR as a possible strategy, pairing it with gene-editing to eliminate CD7 in CAR-bearing cells ($CD7^{ko}$ CD7 CAR T cells) (Gomes-Silva et al. 2017 Blood 130: 285-296). Still, antigenic modulation of CD7 on leukemic/lymphoma cells in vivo is again a likely escape mechanism with this strategy.

In light of the state of the art, the inventors addressed the problem of providing an advantageous therapy for T cell leukemias and lymphomas.

This problem is solved by the present invention, in particular, by the claimed subject-matter.

The inventors have generated T cell receptor (TCR) constructs specifically recognizing an epitope of the CD5 antigen presented in the context of a human MHC I molecule, preferably, HLA-A*02, namely T-7378, T-20109 and T-20332 TCRs. The identification of high-affinity TCRs against the human CD5 antigen was crucial for this project. Generation of optimal affinity TCRs specific for human self-epitopes is a challenge. The inventors used a mouse model transgenic for human TCR locus and HLA-A2 gene (ABabDII) that doesn't have tolerance against most human epitopes. Immunizing these mice, the inventors could generate and identify T cells with human TCRs specific for human epitopes presented in the context of HLA-A2, and successfully used this strategy to develop TCRs specific for the T-cell antigen CD5. T-7378 overall shows the best profile of characteristics, e.g., a very high specificity and a high affinity.

Since the expression of MHC-bound peptides of a given antigen is independent of the cell surface expression of the antigen, all lymphoma cells expressing CD5 either on the surface or in the cytoplasm (i.e., most T-cell lymphomas and leukemias) will be recognized by T cells engineered with a CD5-specific T-cell receptor.

Therefore, the invention provides a nucleic acid encoding a TCR alpha chain construct (TRA) and/or a TCR beta chain construct (TRB) of a TCR construct specific for an epitope in complex with (or in the context of, which is understood to be synonymous) a human MHC I molecule, wherein the epitope is an epitope from human CD5.

A TCR is a heterodimeric cell surface protein of the immunoglobulin super-family which is associated with invariant proteins of the CD3 complex involved in mediating signal transduction. TCRs exist in αβ and γδ forms, which are structurally similar, but have quite distinct anatomical locations and probably functions. The alpha and beta chains of native heterodimeric αβTCR are transmembrane proteins, which each comprise two extracellular domains, a membrane-proximal constant domain, and a membrane-distal variable domain. Each of the constant and variable domains includes an intra-chain disulfide bond. The variable domains contain the highly polymorphic loops analogous to the complementarity determining regions (CDRs) of antibodies.

The variable region of each TCR chain comprises variable and joining segments, and in the case of the beta chain also a diversity segment. Each variable region comprises three CDRs (Complementarity Determining Regions) embedded in a framework sequence, one being the hypervariable region named CDR3. There are several types of alpha chain variable (Vα) regions and several types of beta chain variable (Vβ) regions distinguished by their framework, CDR1 and CDR2 sequences, and by a partly defined CDR3 sequence. Unique TRAV or TRBV numbers are given to Vα or Vβs by IMGT nomenclature. T cell receptor specificity for the epitopes recognized is mainly determined by the CDR3 regions (Danska et al., 1990. J. Exp. Med. 172:27-33; Garcia et al., 2005. *Cell* 122(3): 333-336).

The use of TCR gene therapy allows equipping a patients' own T cells with desired specificities and generation of sufficient numbers of T cells in a short period of time, avoiding their exhaustion. The TCR may be transduced into central memory T cells or T cells with stem cell characteristics, which may ensure better persistence and function upon transfer. TCR-engineered T cells may be infused into cancer patients that have, e.g., been rendered lymphopenic by chemotherapy or irradiation, allowing efficient engraftment but inhibiting immune suppression.

In contrast to CAR-based strategies, TCR-based adoptive T cell therapy relies on classical TCR recognition of processed epitopes of antigens presented in the context of MHC molecules rather than on antibody recognition as with CARs. This has the advantage that surface expression is not necessary for TCR recognition, and, consequently, modulation of surface antigen expression upon binding of CARs does not pose a limitation.

The inventors provide TCR constructs recognizing epitopes of CD5 in the context of HLA-A*02, an MHC haplotype expressed in about 45% of the Caucasian population. Accordingly, a TCR capable of recognizing an epitope in this context can be used in a large proportion of patients. In particular, TCR constructs provided by the invention recognize the peptide of SEQ ID NO: 33 or SEQ ID NO: 1, preferably, SEQ ID NO: 33, in the context of HLA-A*02. In particular, the TCR constructs recognize the epitope of CD5 in the context of HLA-A*02:01. The TCR constructs specifically recognize the peptide of SEQ ID NO: 1 or 33 in this context, i.e., they do not have significant cross-reactivity to non-CD5 self-peptides, in particular, self-peptides presented on the HLA of a patient which is to be treated with the TCR.

In addition to the specific TCRs identified by the inventors, the affinity and specificity of TCR constructs may be further optimized by methods known in the art, as described in more detail below.

Thus, the invention also provides a nucleic acid encoding a TCR alpha chain construct (TRA) and/or a TCR beta chain construct (TRB) of a TCR construct specific for an epitope in complex with HLA-A*02, e.g., HLA-A*02:01, wherein the epitope is SEQ ID NO: 1, wherein the TRA comprises a CDR3 having at least 90% sequence identity to SEQ ID NO: 4, and/or the TRB comprises a CDR3 having at least 90% sequence identity to SEQ ID NO: 7.

Preferably, the TRA comprises a CDR3 of SEQ ID NO: 4. Preferably, the TRB comprises a CDR3 having SEQ ID NO: 7. For example, TRA may comprise a CDR3 of SEQ ID NO: 4. and the TRB may comprise a CDR3 having SEQ ID NO: 7

The TRA may comprise a CDR1 having at least 85% sequence identity to SEQ ID NO: 2 and a CDR2 having at least 87% sequence identity to SEQ ID NO: 3. The TRB may comprise a CDR1 having at least 80% sequence identity to SEQ ID NO: 5 and a CDR2 having at least 83% sequence identity to SEQ ID NO: 6.

Optionally, said TRA has a variable region having at least 70% sequence identity to SEQ ID NO: 10 and/or said TRB has a variable region having at least 70% sequence identity to SEQ ID NO: 11.

In the nucleic acid of the invention, the TRA preferably comprises a CDR1 having SEQ ID NO: 2, a CDR2 having SEQ ID NO: 3 and a CDR3 having SEQ ID NO: 4. In the nucleic acid of the invention, the TRB preferably comprises a CDR1 having SEQ ID NO: 5, a CDR2 having SEQ ID NO: 6 and a CDR3 having SEQ ID NO: 7.

Interestingly, the inventors could show that two TCR constructs they identified have a similar TRB, in particular, a highly similar CDR3 that has the consensus sequence of SEQ ID NO: 7. As the inventors showed, X in SEQ ID NO: 7 is variable. It may be R or Q (SEQ ID NO: 8 and 9). X may also be another amino acid, preferably a polar amino acid such as N, D or K.

In one embodiment of the invention, the TRB comprises a CDR3 having SEQ ID NO: 8. Preferably, in this embodiment, the TRA has a variable region having at least 80% sequence identity to SEQ ID NO: 10 and/or the TRB has a variable region having at least 80% sequence identity to SEQ ID NO: 11. Optionally, the nucleic acid encoding the TRA has at least 80% sequence identity to SEQ ID NO: 14 and/or the nucleic acid encoding the TRB has at least 80% sequence identity to SEQ ID NO: 15.

In one embodiment of the invention, the TRB comprises a CDR3 having SEQ ID NO: 9. Preferably, in this embodiment, the TRA has a variable region having at least 80% sequence identity to SEQ ID NO: 12 and/or the TRB has a variable region having at least 80% sequence identity to SEQ ID NO: 13. Optionally, the nucleic acid encoding the TRA has at least 80% sequence identity to SEQ ID NO: 16 and/or the nucleic acid encoding the TRB has at least 80% sequence identity to SEQ ID NO: 17.

In a preferred embodiment, the invention also provides a nucleic acid encoding a TCR alpha chain construct (TRA) and/or a TCR beta chain construct (TRB) of a TCR construct specific for an epitope in complex with HLA-A*02, e.g., HLA-A*02:01, wherein the epitope is SEQ ID NO: 33, wherein the TRA comprises a CDR3 having at least 90% sequence identity to SEQ ID NO: 36, and/or the TRB comprises a CDR3 having at least 90% sequence identity to SEQ ID NO: 39. Such TCR constructs are herein also designated T-7378 or derivatives thereof.

The epitope of SEQ ID NO: 33, SICEGTVEV, is an advantageous target for T cell therapy, because it represents residues 283-291 of CD5 and is part of two known isoforms of CD5, while the CD5 epitope of SEQ ID NO: 1 is derived only from isoform 1. Targeting this epitope would prevent potential escape variants when that may arise by switching from the isoform 1 to isoform 2 if the CD5 epitope of SEQ ID NO: 1 is targeted.

Preferably, the TRA comprises a CDR3 of SEQ ID NO: 36. Preferably, the TRB comprises a CDR3 having SEQ ID NO: 39. For example, TRA may comprise a CDR3 of SEQ ID NO: 36. and the TRB may comprise a CDR3 having SEQ ID NO: 39.

The TRA may comprise a CDR1 having at least 85% sequence identity to SEQ ID NO: 34 and a CDR2 having at least 87% sequence identity to SEQ ID NO: 35. The TRB may comprise a CDR1 having at least 80% sequence identity to SEQ ID NO: 37 and a CDR2 having at least 83% sequence identity to SEQ ID NO: 38.

Optionally, said TRA has a variable region having at least 70% sequence identity to SEQ ID NO: 40 and/or said TRB has a variable region having at least 70% sequence identity to SEQ ID NO: 41.

In the nucleic acid of the invention, the TRA preferably comprises a CDR1 having SEQ ID NO: 34, a CDR2 having SEQ ID NO: 35 and a CDR3 having SEQ ID NO: 36. In the nucleic acid of the invention, the TRB preferably comprises a CDR1 having SEQ ID NO: 37, a CDR2 having SEQ ID NO: 38 and a CDR3 having SEQ ID NO: 39.

Optionally, the nucleic acid encoding the TRA has at least 80% sequence identity to SEQ ID NO: 42, at least 90% sequence identity to SEQ ID NO: 42 or SEQ ID NO: 42. Optionally, the nucleic acid encoding the TRB has at least 80% sequence identity to SEQ ID NO: 43, at least 90% sequence identity to SEQ ID NO: 43 or SEQ ID NO: 43. SEQ ID NO: 42 and 43 represent the nucleic acid sequences isolated which have been used in the experiments described herein. Alternatively, the nucleic acid sequences may be codon-optimized, e.g., as in SEQ ID NO: 44 and SEQ ID NO: 45. In this case, the nucleic acid encoding the TRA may have at least 80% sequence identity to SEQ ID NO: 44, at least 90% sequence identity to SEQ ID NO: 44 or SEQ ID NO: 44. Optionally, the nucleic acid encoding the TRB may have at least 80% sequence identity to SEQ ID NO: 45, at least 90% sequence identity to SEQ ID NO: 45 or SEQ ID NO: 45.

Preferably, a nucleic acid of the invention encodes one TCR alpha chain construct and one TCR beta chain construct. In the context of the present invention, "a" is understood to mean "one or more" unless expressly stated otherwise. Accordingly, for example, as the TCR construct of the invention contains both alpha and beta chain constructs, it may be encoded by either one or two nucleic acids. The alpha and beta chain constructs together are capable of specifically binding to the peptide of SEQ ID NO: 1 in complex with HLA-A*02, if the TRA comprises a CDR3 having at least 90% sequence identity to SEQ ID NO: 4, and/or the TRB comprises a CDR3 having at least 90% sequence identity to SEQ ID NO: 7. Alternatively, in case the CDR3 has at least 90% sequence identity to SEQ ID NO: 36, and/or the TRB comprises a CDR3 having at least 90% sequence identity to SEQ ID NO: 39, the alpha and beta chain constructs together are capable of specifically binding to the peptide of SEQ ID NO: 33 in complex with HLA-A*02.

As intermediate products, the alpha and beta chain constructs and the nucleic acids encoding them are also subject matter of the invention by themselves.

Preferably, in all TCR alpha and/or beta chain constructs of the invention, the sequence identity to the CDR regions defined herein is 100%.

However, based on the defined CDR3 and variable region sequences provided by the invention, it is possible to carry out affinity maturation of the TCR sequences (Chervin et al. 2008. J Immunol Methods.339(2):175-84); Robbins et al., 2008. J Immunol. 180:6116-31). Non-synonymous nucleotide substitutions, which lead to amino acid exchanges in the CDR3 sequence, may lead to enhanced affinity of the TCR to target antigen. Furthermore, TCR sequence changes in other parts of the variable TRA and TRB regions may change affinity of the TCR to the peptide-MHC complex. This may increase overall affinity of the TCR to the peptide-MHC, but harbors the risk of unspecific recognition and increased cross-reactivity (Linette et al. 2013. Blood 122 (6):863-72). It is preferred that TCRs varying from the specific sequences provided retain exclusive specificity for the target antigen provided, i.e., that they are not cross-reactive, most importantly, that they do not have cross-reactivity for human self-peptides. Potential cross-reactivity of TCR can be tested against known self-peptides loaded on cells with the correct MHC allele (Morgan et al., 2013, J. Immunother. 36, 133-151). Accordingly, it is preferred that adoptive transfer of T cells expressing the TCR construct of the invention has no or significant negative effects on healthy tissue.

The affinity of the TCR construct of the invention allows for efficient targeting of the CD5-expressing tumor cells in a human patient. Affinity (or avidity, because a typical TCR has two binding sites) can be analyzed by methods well known to the skilled person, e.g. by BIOCORE®. Preferably, throughout the invention, the TCR construct of the invention has a high affinity to the peptide of SEQ ID NO: 1, or SEQ ID NO: 33, in the case of T-7378 or its derivatives, respectively, each in the context of HLA-A*02:01, e.g., in the range of the affinity of the specific TCRs identified by the inventors, T-7378, T-20109 and T-20332, or a higher affinity. Preferably, throughout the invention, the TCR construct of the invention also has a high peptide sensitivity to the peptide of SEQ ID NO: 1, or SEQ ID NO: 33, in the case of T-7378 or its derivatives, respectively, each in the context of HLA-A*02:01, e.g., in the range of the peptide sensitivity of the specific TCRs identified by the inventors, T-7378, T-20109 and T-20332, or a higher peptide sensitivity. Peptide sensitivity can be determined as explained in the experimental part for the respective TCRs, e.g., in 1.8.1 below, or in the experiment underlying FIG. 2b or 6b. It is typically defined as the peptide concentration to induce half-maximal IFN-gamma release. Peptide sensitivity allows conclusions on TCR affinity to be drawn. In the context of the invention, "about" is understood to refer to the defined value+/−10%, preferably, +/−5%. A TCR alpha and/or beta chain construct of the invention may comprise all characteristics or domains corresponding to its native counterpart, but this is not essential. Preferably, the TCR alpha and/or beta chain construct comprises at least a variable region, or a variable and a constant region, e.g., the variable and/or constant region having at least 60%, at least 70%, at least 80%, at least 90% or at least 95% sequence identity to a human variable or constant TCR region. For adoptive TCR therapy, it is preferred that the TCR construct comprises full length TCR alpha and beta chains comprising variable, constant and transmembrane regions.

The TCR construct preferably is of essentially human origin to minimize immunogenicity. It may also be completely human. To prevent pairing with endogenous TCR chains, the constructs of the invention however preferably contain one or more, e.g., 1-5, 1-10 or 1-20, amino acid exchanges, insertions or deletions in comparison to a human sequence, e.g., providing an additional cysteine to enable formation of an additional disulfide bond (Sommermeyer et al., 2010, J. Immunol. 184, 6223-31). Otherwise, the constant regions of the TCR construct are preferably human. The constant regions of such TCR may be minimally murine constant regions. The constant region of the TCR alpha and beta chain construct may also be a murine constant region.

Single chain constructs (scTCR) are encompassed as well as heterodimeric TCR constructs. A scTCR can comprise a variable region of a first TCR chain construct (e.g., an alpha chain) and an entire (full-length) second TCR chain (e.g., a beta chain), or vice versa. Furthermore, the scTCR can optionally comprise one or more linkers which join the two or more polypeptides together. The linker can be, for instance, a peptide which joins together two single chains, as described herein. Also provided is such a scTCR of the invention, fused to a cytokine, e.g., a human cytokine, such as IL-2, IL-7 or IL-15.

The TCR construct according to the invention can also be provided in the form of a multimeric complex, comprising at least two scTCR molecules, wherein said scTCR molecules are each fused to at least one biotin moiety, and wherein said scTCRs are interconnected by biotin-strepavidin interaction to allow the formation of said multimeric complex. Also provided are multimeric complexes of a higher order, comprising more than two, e.g., four, scTCR of the invention. Such complexes may be, e.g., for diagnostic purposes, or may be coupled to a diagnostic or therapeutic, e.g., toxic, agent.

Preferably, the nucleic acid encoding the TCR alpha chain construct and/or TCR beta chain construct or TCR construct of the invention is a vector. Suitable vectors include those designed for propagation and expansion, or for expression or both, such as plasmids and viruses. The nucleic acid of the invention, in particular if it encodes at least one TCR alpha and beta chain construct of the TCR construct, may, e.g., be a viral vector, a transposon or a vector suitable for CRISPR/CAS based recombination.

The vector may be an expression vector suitable for expression is a host cell selected from the group comprising a human T cell or a human T cell precursor, preferably, a human T cell such as CD8+ T cell, e.g., a CD8+ central-memory T cell, CD8+ effector-memory T cell, CD8+ stem cell-like T cell. The vector may be a viral vector, e.g. a retroviral, in particular gamma-retroviral or lentiviral vector. Examples of suitable expression vectors include the retroviral vector MP71.

The expression vector comprises regulatory sequences, such as transcription and translation initiation and termination codons, which are specific to the type of host cell (for example, bacterium, fungus, plant, or animal cell, e.g., a human CD8+ T cell as defined above) into which the vector is to be introduced and in which the expression of the nucleic acid of the invention shall be performed. Furthermore, the vector of the invention may include one or more marker genes, which allow for selection of transformed or transfected hosts. The expression vector can comprise a native or, preferably, heterologous promoter operably linked to the nucleotide sequence encoding the construct of the invention, or to the nucleotide sequence which is complementary to or which hybridizes to the nucleotide sequence encoding the constructs of the invention. The selection of promoters includes, e.g., strong, weak, inducible, tissue-specific and developmental-specific promoters. The promoter can be a non-viral promoter or a viral promoter. Preferably, it is a heterologous promotor, i.e., a promotor not naturally linked to TCR in human T cells, such as long terminal repeat promotor, which is suitable for expression in human T cells, or an MPSV promotor. The vector may comprise a PRE, e.g., woodchuck hepatitis virus PRE, preferably, in a form excluding expression of the X protein. The inventive expression vectors can be designed for either transient expression, for stable expression, or for both. Also, the expression vectors can be made for constitutive expression or for inducible expression.

The present invention also provides a protein, i.e., an alpha or beta chain construct, or, preferably, a TCR construct comprising both alpha and beta chain constructs, which is capable of specifically binding HLA-A*02 in complex with the epitope of SEQ ID NO: 1, or of specifically binding HLA-A*02 in complex with the epitope of SEQ ID NO: 33 (depending on the TCR construct, as explained herein). The protein is preferably encoded by the nucleic acids of the invention. It is preferably expressed as a transmembrane protein by a host cell.

The invention also provides a host cell comprising a nucleic acid and/or protein of the invention, preferably, both. The host cell can be a eukaryotic cell, e.g., plant, animal, fungi, or algae, or can be a prokaryotic cell, e.g., bacteria or protozoa. The host cell can be a cultured cell or a primary cell, i.e., isolated directly from an organism, e.g., a human. The host cell can be an adherent cell or a suspended cell, i.e., a cell that grows in suspension. For purposes of producing a recombinant TCR, polypeptide, or protein, the host cell is preferably a mammalian cell. Most preferably, the host cell is a human cell. While the host cell can be of any cell type, can originate from any type of tissue, and can be of any developmental stage, the host cell preferably is a peripheral blood leukocyte (PBL) or a peripheral blood mononuclear cell (PBMC). More preferably, the host cell is a T cell or T cell precursor, in particular, a human T cell. The T cell can be any T cell, such as a cultured T cell, e.g. a primary T cell, or a T cell from a cultured T cell line, or a T cell obtained from a mammal, preferably, it is a T cell or T cell precursor from a human patient. The T cell can be obtained from numerous sources, such as blood, bone marrow, lymph node, the thymus, or other tissues or fluids. T cells can also be enriched for or purified. Preferably, the T cell is a human T cell. More preferably, the T cell is a T cell isolated from a human, e.g., a human patient. The T cell can be any type of T cell, but it preferably is a CD8$^+$ cell. It can be of any developmental stage, including but not limited to tumor infiltrating cells (TILs), effector cells, central effector cells, memory T cells, naive T cells, and the like, preferably central-memory T cells.

The host cell of the invention preferably comprises a nucleic acid of the invention and/or a protein of the invention, wherein the host cell preferably is a CD8$^+$ T cell, optionally, a human CD8$^+$ T cell. The nucleic acid in this case typically is an expression vector suitable for constitutive expression of alpha and beta chain constructs of the invention in the human CD8$^+$ T cell.

Such host cells or pharmaceutical compositions comprising them, and optionally, pharmaceutically acceptable excipients and/or buffers, may be used for adoptive T cell therapy or T cell receptor (TCR) gene therapy of cancer. They may be used, in particular, in the diagnosis, prevention and/or treatment of a CD5-positive T-cell lymphoma or T-cell leukemia, e.g., in a human patient. The human patient to be treated expresses HLA-A*02, which is able to present the epitope of SEQ ID NO: 1 and SEQ ID NO: 33 and thus, to activate a host T cell of the invention, e.g., HLAA*02-01.

The present invention however has to deal with specific difficulties in the practice of adoptive T cell therapy. In particular, if no additional measures are taken, as CD5 is a T cell lineage specific antigen, T cells expressing the transgenic TCR construct of the invention will also express CD5 and HLA-A*02, and thus, will be subject to fratricidal killing. Thus, the T cell response provided by the T cells expressing the TCR construct of the invention may be self-limiting. This may be desired in some settings. Optionally, the pharmaceutical composition of the invention, e.g., comprising transgenic T cells of the invention, may be administered repeatedly, such as two, three, four, five or more times, e.g., each new dose being administered after the concentration of transgenic T cells has fallen below a desired level.

However, it also can be beneficial to avoid such self-limitation, in particular, when the therapeutic goal, i.e., further therapy of the cancer such as reduction or elimination of CD5-positive lymphoma cells, has not yet been met. Therefore, in a preferred embodiment, in therapeutic approaches of the invention, expression of HLA-A*02 which allows for presentation of the targeted CD5 epitope, or the CD5 epitope itself is avoided or reduced on T cells transferred to the patient.

In particular, in therapeutic approaches of the invention, expression of HLA-A*02 is avoided or reduced on T cells transferred to the patient. To this end, in one embodiment, the invention provides a composition or kit comprising a nucleic acid of the invention, preferably, a TCR construct of the invention, and an agent for inhibiting expression of HLA-A*02 selected from the group comprising RNAi suitable for suppression of HLA-A*02 expression, e.g., by mRNA cleavage or by transcriptional blockage, such as silencing RNA, siRNA, shRNA, or miRNA. RNAi can be permanent RNAi or conditional RNAi. Agents for inhibiting expression of HLA-A*02 are known in the art, e.g., via siRNA or Zinc finger genome editing (e.g., Liang et al., 2016, J. Neuroimmunol. 297:28-37), and such agents may be employed in the context of the present invention. The agent may be, e.g.,
  a) miRNA, or a nucleic acid encoding said miRNA, and
  b) a ribonucleoprotein complex comprising CRISPR and a guide RNA suitable for targeting CRISPR to suppress HLA-A*02 expression.

The agent may also be a Transcription Activator-like Effector Nuclease (TALEN) suitable for suppressing HLA-A*02 expression, or a Zinc-finger nuclease suitable for suppressing HLA-A*02 expression.

In a preferred embodiment, the agent is miRNA. However, it is not important to know the mechanism by which expression of HLA-A*02 is reduced, as long as it is reduced.

If the agent for inhibiting expression of HLA-A*02 is a nucleic acid encoding RNAi, e.g., miRNA, said nucleic acid can be on the same nucleic acid as the nucleic acid encoding the TCR construct of the invention. The nucleic acid encoding the RNAi, e.g., miRNA may, for example, be DNA, e.g., in the context of a transposon. Alternatively, it may be RNA, e.g., retroviral RNA, in the context of a retroviral expression vector. In any case, expression of the TCR construct of the invention and the RNAi, e.g., miRNAs may be regulated by the same promoter. The sequence encoding the TCR construct may comprise an intron encoding the RNAi, e.g., miRNA. For example, a construct according to WO2017/158019 A1 may be employed.

The nucleic agent encoding the TCR construct of the invention and the agent for inhibiting expression of HLA-A*02 may be in one composition, and may thus be used for simultaneous engineering of a T cell. Alternatively, they may be in a kit, e.g., in separate containers. In this case, they may be mixed before use, or they may be used sequentially, in any order, on the same T cell host.

Thus, CD5-TCR constructs of the invention may be introduced in the patient's (HLA-A2 positive) autologous T-cells, and the HLA-A molecules may be suppressed, silenced or knocked-out in the TCR gene-modified T cells using inhibitory (e.g., miRNA) technology or CRISPR/Cas9 technology. This eliminates presentation of the CD5 peptide and therefore prevents the possibility of recognition via the specific TCR and, consequently, of fratricide killing. A proportion of HLA-A-silenced T cells (also derived from the patient) that is not TCR-gene-modified may be co-transferred to the patient in order to preserve normal TCR reactivity against pathogens.

The invention thus also provides a host cell comprising a nucleic acid and/or protein of the invention, wherein the host cell does not express HLA-A*02 or comprises an agent for inhibiting expression of HLA-A*02, e.g., as defined herein. The invention also provides a host cell comprising a nucleic acid and/or protein of the invention, wherein the host cell has a downregulated expression of HLA-A*02 (e.g., reduced compared to primary T cells from a healthy HLA-A*02-positive human subject). Said downregulation is effected by an agent for inhibiting expression of HLA-A*02, e.g., as defined herein.

Thus, the adoptive T cell therapy of the invention preferably is to be carried out in combination with an agent capable of inhibiting expression of HLA-A*02 in the TCR-transgenic T cells.

In other therapeutic approaches of the invention, expression of CD5 is avoided or reduced on T cells transferred to the patient. To this end, in one embodiment, the invention provides a composition or kit comprising a nucleic acid of the invention, preferably, a TCR construct of the invention, and an agent for inhibiting expression of CD5 selected from the group comprising RNAi suitable for suppression of CD5 expression, e.g., by mRNA cleavage or by transcriptional blockage, such as silencing RNA, siRNA, shRNA, or miRNA. RNAi can be permanent RNAi or conditional RNAi. Agents for inhibiting expression of CD5 are known in the art, e.g., via shRNA (e.g., Sarhan et al., 2012, J. Virol. 86(7):3723-35), and such agents may be employed in the context of the present invention. The agent may be, e.g., a) miRNA, or a nucleic acid encoding said miRNA, and
b) a ribonucleoprotein complex comprising CRISPR and a guide RNA suitable for targeting CRISPR to suppress CD5 expression.

The agent may also be a Transcription Activator-like Effector Nuclease (TALEN) suitable for suppressing CD5 expression, or a Zinc-finger nuclease suitable for suppressing CD5 expression.

In a preferred embodiment, the agent is miRNA. However, it is not important to know the mechanism by which expression of CD5 is reduced, as long as it is reduced.

If the agent for inhibiting expression of CD5 is a nucleic acid encoding RNAi, e.g., miRNA, said nucleic acid can be on the same nucleic acid as the nucleic acid encoding the TCR construct of the invention. The nucleic acid encoding the RNAi, e.g., miRNA may, for example, be DNA, e.g., in the context of a transposon. Alternatively, it may be RNA, e.g., retroviral RNA, in the context of a retroviral expression vector. In any case, expression of the TCR construct of the invention and the RNAi, e.g., miRNAs may be regulated by the same promoter. The sequence encoding the TCR construct may comprise an intron encoding the RNAi, e.g., miRNA. For example, a construct according to WO2017/158019 A1 may be employed.

The nucleic agent encoding the TCR construct of the invention and the agent for inhibiting expression of CD5 may be in one composition, and may thus be used for simultaneous engineering of a T cell. Alternatively, they may be in a kit, e.g., in separate containers. In this case, they may be mixed before use, or they may be used sequentially, in any order, on the same T cell host.

Thus, CD5-TCR constructs of the invention may be introduced in the patient's (HLA-A2 and CD5 positive) autologous T-cells, and the CD5 molecules may be suppressed, silenced or knocked out in the TCR gene-modified T cells using inhibitory (e.g., miRNA) technology or CRISPR/Cas9 technology. This strategy also eliminates presentation of the CD5 peptide and therefore prevents the possibility of recognition via the specific TCR and, consequently, of fratricide killing. A proportion of CD5-silenced T cells (also derived from the patient) that is not TCR-gene-modified may be co-transferred to the patient in order to preserve normal TCR reactivity against pathogens.

The invention thus also provides a host cell comprising a nucleic acid and/or protein of the invention, wherein the host cell does not express CD5 or comprises an agent for inhibiting expression of CD5, e.g., as defined herein. The invention also provides a host cell comprising a nucleic acid and/or protein of the invention, wherein the host cell has a downregulated expression of CD5 (e.g., reduced compared to primary T cells from a healthy HLA-A*02-positive CD5 positive human subject). Said downregulation is effected by an agent for inhibiting expression of CD5, e.g., as defined herein.

Thus, the adoptive T cell therapy of the invention may be carried out in combination with an agent capable of inhibiting expression of CD5 in the TCR-transgenic T cells.

Of course, it is also possible that expression of CD5 and HLA-A*02 is avoided or reduced on T cells transferred to the patient. To this end, in one embodiment, the invention provides a composition or kit comprising a nucleic acid of the invention, preferably, a TCR construct of the invention, and agents for inhibiting expression of CD5 and HLA-A*02 selected from the group comprising RNAi suitable for suppression of CD5 and HLA-A*02 expression, as described herein.

The nucleic agent encoding the TCR construct of the invention and the agents for inhibiting expression of CD5 and HLA-A*02 may be in one composition, and may thus be used for simultaneous engineering of a T cell. Alternatively, they may be in a kit, e.g., in separate containers. In this case, they may be mixed before use, or they may be used sequentially, in any order, on the same T cell host.

Thus, CD5-TCR constructs of the invention may be introduced in the patient's (HLA-A2 and CD5 positive) autologous T-cells, and the CD5 and HLA-A*02 molecules may be suppressed, silenced or knocked-out in the TCR gene-modified T cells using inhibitory (e.g., miRNA) technology or CRISPR/Cas9 technology. This strategy eliminates presentation of the CD5 peptide by two redundant pathways and therefore prevents the possibility of recognition via the specific TCR and, consequently, of fratricide killing with high safety. A proportion of CD5- and HLA-A*02-silenced T cells (also derived from the patient) that is not TCR-gene-modified may be co-transferred to the patient in order to preserve normal TCR reactivity against pathogens.

The invention thus also provides a host cell comprising a nucleic acid and/or protein of the invention, wherein the host cell does not express CD5 or HLA-A*02 or comprises agents for inhibiting expression of CD5 and HLA-A*02, e.g., as defined herein. The invention also provides a host cell comprising a nucleic acid and/or protein of the invention, wherein the host cell has a downregulated expression of CD5 and HLA-A*02 (e.g., reduced compared to primary T cells from a healthy HLA-A*02-positive CD5 positive human subject, optionally, no such expression). Said downregulation is effected by agents for inhibiting expression of CD5 and HLA-A*02, e.g., as defined herein.

Thus, the adoptive T cell therapy of the invention may be carried out in combination with agents capable of inhibiting expression of CD5 and HLA-A*02 in the TCR-transgenic T cells.

Alternatively, treatment may be in the context of allogeneic stem cell transplantation, in particular, mismatch-transplantation, or haploidentical transplantation. In the context of allogeneic stem cell transplantation, wherein T-cells from an HLA-A*02 negative donor are genetically modified to express the CD5 specific T cell receptor construct of the invention, and reinfused in a HLA-A*02 positive patient with CD5 positive T-cell leukemia or lymphoma. This may be in the context of a "HLA-A2-mismatched" allogeneic transplantation (either a single-locus mismatch or a haploidentical-transplantation). Preferably, the donor's T cells, except for HLA-A2-expression, essentially or completely share the other patient's MHC alleles (preferably, in a "9/10 HLA-Matched Unrelated Donor transplantation" or "9/10 MUD Transplant"). However, identity may also be lower, e.g., for a haploidentical transplantation, 5/10 alleles, or 6/10 alleles, 7/10 alleles or 8/10 alleles (considering 10 alleles, HLA-A, B, C, DR, and DP).

Such genetically modified T-cells, i.e., host T cells of the invention, will recognize the patient's malignant T-cells, eradicating the disease, and also the recipient's normal T-cells. They will thereby facilitate engraftment of both the donor's stem cells and gene-modified T-cells, and at the same time providing best conditions for homeostatic T-cell proliferation which has been shown to be critical for the success of adoptive T-cell therapy. Only a proportion of the donor's T cells will be gene-modified to express the CD5-specific TCR, in order to preserve normal T-cell "repertoire". This would allow for normal T-cell reactivity to be conserved in the reconstituted T-cell population.

The present invention also provides a pharmaceutical composition comprising
a) a nucleic acid of the invention encoding a TCR construct capable of specifically binding to a peptide of SEQ ID NO: 1 in the context of HLA-A*02, as described herein; or
b) a protein of the invention comprising a TCR construct capable of specifically binding to a peptide of SEQ ID NO: 1 in the context of HLA-A*02; or
c) a composition or kit comprising, in addition to the nucleic acid of a), an agent for inhibiting expression of HLA-A*02 and/or CD5 as defined herein; or
d) a host cell of the invention expressing a TCR construct capable of specifically binding to a peptide of SEQ ID NO: 1 in the context of HLA-A*02.

Alternatively, and preferably, the present invention also provides a pharmaceutical composition comprising
a) a nucleic acid of the invention encoding a TCR construct capable of specifically binding to a peptide of SEQ ID NO: 33 in the context of HLA-A*02, as described herein; or
b) a protein of the invention comprising a TCR construct capable of specifically binding to a peptide of SEQ ID NO: 33 in the context of HLA-A*02; or
c) a composition or kit comprising, in addition to the nucleic acid of a), an agent for inhibiting expression of HLA-A*02 and/or CD5 as defined herein; or
d) a host cell of the invention expressing a TCR construct capable of specifically binding to a peptide of SEQ ID NO: 33 in the context of HLA-A*02.

The host cell of d) preferably is a host with a reduced expression of HLA-A*02 or CD5 or not expressing HLA-A*02 or CD5, as described herein (i.e., either an allogeneic host cell or a cell comprising an agent for inhibiting expression of HLA-A*02 and/or CD5). Optionally, in addition to said host cell, the pharmaceutical composition further comprises T cells with a reduced expression of HLA-A*02 and/or CD5, or not expressing HLA-A*02 and/or CD5, and/or comprising an agent for inhibiting expression of HLA-A*02 and/or CD5, wherein said T cells do not express the TCR construct of the invention. The composition may also comprise donor hematopoietic stem cells with a reduced expression of HLA-A*02, or not expressing HLA-A*02, and/or comprising an agent for inhibiting expression of HLA-A*02.

If said pharmaceutical composition only or essentially comprises T cells expressing the TCR construct of the invention, it is optionally for use in administration to a patient who is further (e.g., at the same time, or within a day, two days, three days, 4 days, 5 days, a week, two weeks or four weeks) administered a pharmaceutical composition comprising T cells not expressing HLA-A* and/or CD5, or comprising an agent for inhibiting expression of HLA-A*02 and/or CD5. These T cells preferably do not express a transgenic TCR.

Preferably, the pharmaceutical composition comprises a human CD8$^+$ host cell of the invention, as defined herein. Said host cell may, e.g., comprise a vector encoding a TCR construct comprising a TCR alpha chain construct and a TCR beta chain construct capable of specifically recognizing the peptide of SEQ ID NO: 1 or 33 in the context of HLA-A*02. Preferably, the vector is an expression vector for expression of both alpha and beta chain constructs on one nucleic acid, e.g., separated by a p2A element. The variable regions of the TCR chains as defined herein are linked with constant regions, e.g., with minimally murine constant regions.

Alternatively, the patient may also be administered a nucleic acid of the invention, in particularly, an expression vector, for in vivo transduction of T cells.

The pharmaceutical composition of the invention or the kit of the invention may be for use in the diagnosis, prevention and/or treatment of a disease associated with abnormal proliferation and/or activation of a T cell or a T cell precursor, in particular in a patient having a T cell lymphoma or a T cell leukemia. The patient is a human HLA-A*02-positive patient. In a preferred embodiment, the tumor cells have been confirmed to express HLA-A*02. They further express CD5, with or without cell surface expression.

As the inventors found that the TCR of the present invention has a certain cross-reactivity with self-peptide presented on HLA-C*12, the patient preferably does not express HLA-C*12 to avoid potentially problematic autoreactive responses.

The patient may have a non-Hodgkin T-cell lymphoma such as peripheral T-cell lymphoma including Peripheral T-cell lymphoma not otherwise specified (PTCL NOS), Anaplastic large cell lymphoma, primary systemic type (ALCL), Angioimmunoblastic T cell lymphoma (AITL), Extranodal NK/T cell lymphoma, nasal type, Adult T cell leukemia/lymphoma (ATL), Enteropathy associated T cell lymphoma (EATL), Hepatosplenic gamma-delta T-cell lymphoma, Mycosis fungoides/Sezary syndrome, Subcutaneous panniculitis like T cell lymphoma or precursor T-cell lymphoblastic Lymphoma (precursor T-LBL) or Leukemia (precursor T-cell ALL) and T-cell prolymphocytic leukemia (T-PLL).

Preferably, the disease is treated. The present invention also provides a method for treating a subject suffering from a disease as specified above, in particular, a tumor or tumor disease as described herein, comprising administering a nucleic acid, protein or host cell of the invention. Preferably the subject is a subject in need of such a treatment, i.e. a patient. The active agent is administered in an effective amount.

One preferred medicinal use of the invention relates to immune therapy, preferably adoptive T cell therapy. The product and methods of the invention are particularly useful in the context of adoptive T cell therapy. The administration of the compounds of the invention can for example involve the administration, e.g., infusion of T cells of the invention into said patient. Optionally, such T cells are autologous T cells of the patient which were in vitro transduced with a nucleic acid of the present invention.

The treatment of the invention may be first-line treatment of the patient. Preferably, it is second-line treatment of the patient, e.g., if the patient has relapsed or is refractory to therapy with one or more alternative agents (e.g., chemotherapy, including high-dose chemotherapy with autologous stem cell transplantation, antibodies including immunotoxins or small molecular compounds). Preferably, the patient has relapsed or primarily refractory T cell lymphoma or leukemia not suitable for standard allogeneic stem cell transplantation or may have relapsed after HLA-identical allogeneic stem cell transplantation.

The invention also relates to a method of preparing a host cell of the invention, comprising introducing an expression vector encoding a TCR construct of the invention into a suitable host cell, preferably, a human T cell, most preferably, a human $CD8^+$ T cell isolated from a patient or from a normal individual chosen as donor for allogeneic stem cell transplantation. This includes both patients with HLA-A2 "single locus mismatch-transplantation" as well as haploidentical allogeneic stem cell transplantation. Said host cell can then be introduced into the patient.

It is possible to transduce a mixture of CD4 and CD8 T cells with the TCR construct of the invention, i.e., to use T cells isolated without selection of CD8 T cells. As CD8 is needed for reactivity with MHC I, isolation or enrichment of CD8 T cells is preferred.

The present invention is further illustrated in the following examples with reference to the accompanying figures and sequences, nevertheless, without being limited thereto. For the purposes of the present invention, all references as cited herein are incorporated by reference in their entirety.

c) Fratricide-induced selective pressure resulted in dramatic increase in the percentage of HLA-A2-edited cells by day 8 when cells received A2-5 RNPs and were transduced with both CD5 TCRs, but not control TCR.

d, e) HLA-A2-edited cells modified with T-20109 (d, solid line) or T-20332 TCRs (e, solid line) were used in a co-culture with peptide loaded T2 cells for a peptide titration assay. HLA-A2-edited cells with TCR performed similar to TCR transduced cells from an HLA-A2⁻ donor (d, e, dashed lines), showing that knocking out HLA-A2 does not have any effect on TCR functionality(see table 2 for Kd values).

Figure 5:
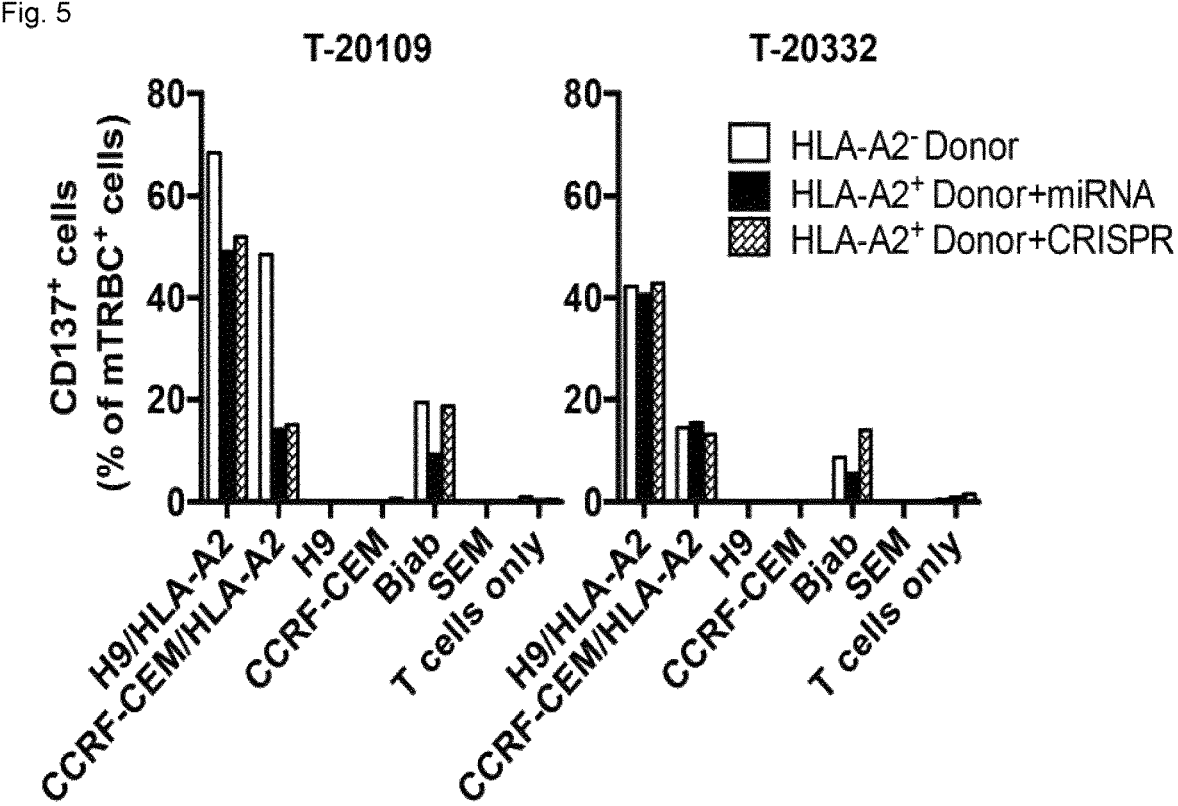

FIG. 5: Comparison of RNAi mediated HLA-A2 knock down and CRISPR mediated HLAA2-editing on functionality of CD5-TCR transduced T cells.

RNAi-TCR cells and CRISPR-TCR cells were co-cultured with cell lines expressing CD5 and/or HLA-A2 molecule. Activation was analyzed by FACS via CD137 upregulation on the effector cell surface. Cells from an HLA-A2⁻ donor performed slightly better for T-20109 (left pane, white bar). RNAi-TCR cells (left pane, black bar) and CRISPR-TCR cells (left pane, patterned bar) did not exhibit any difference in terms of CD137 upregulation. We did not observe any difference in case of T-20332 among HLA-A2⁻ donor (right pane, white bar), RNAi-TCR cells (right pane, black bar) or CRISPR-TCR cells (right pane, patterned bar)

Figure 6:
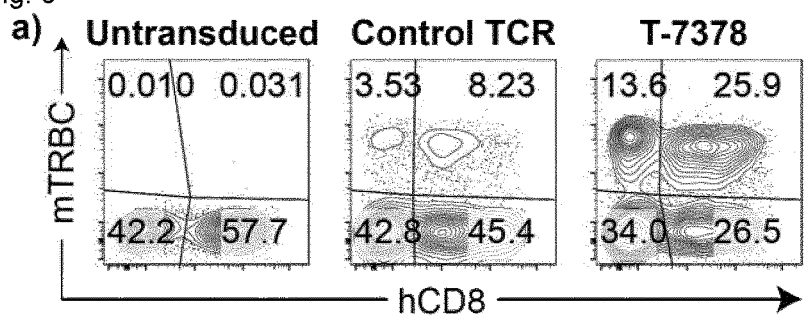
Figure 6:
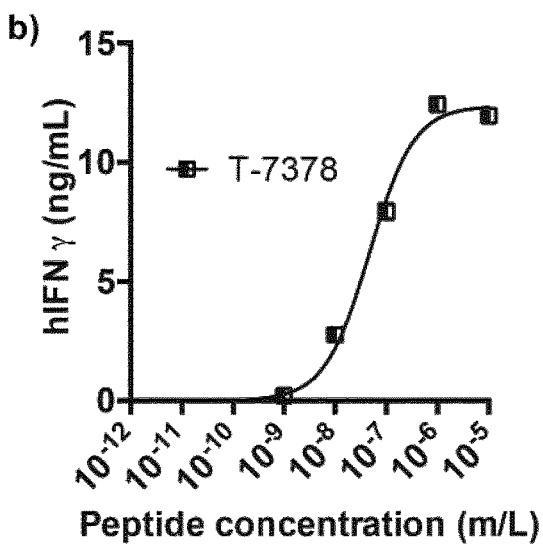
Figure 6:
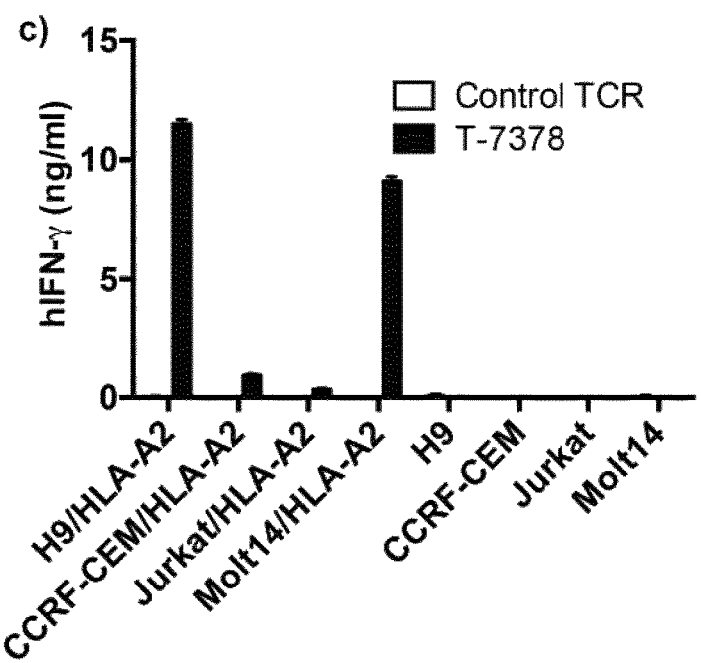
Figure 6:
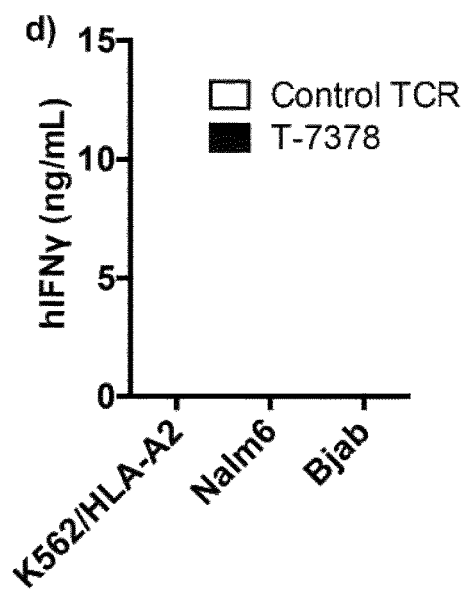

FIG. 6: Re-expression of T-7378 TCR in HLA-A2⁻ human peripheral blood lymphocytes.

The T-7378 TCR recognizing the SIC epitope (SEQ ID NO: 33) was generated and cloned following the same methods described for the TCRs specific to YLK epitope.

a) FACS analysis of HLA-A2⁻ human peripheral blood lymphocytes (hPBLs) after transduction with T-7378. The transduction rate varied between 11-40% depending on the virus titer.

b) To deduce TCR affinity, T cells transduced with T-7378 TCR were co-cultured overnight with T2 cells loaded with decreasing concentration of SIC peptide (SEQ ID NO: 33) at an effector to target ratio of 1:1. IFN-γ release was detected by ELISA. A representative of peptide titration is shown here.

c) IFN-γ release by T-7378 transduced T cells against CD5⁺ target cell lines. The target cell lines did not have HLA-A2 allele; therefore, they were generated by retroviral delivery of HLA-A2. T cells were co-cultured with target cell lines at an effector to target ratio of 1:1. After overnight incubation, cell-free supernatant was collected and IFN-γ release was detected by ELISA. Effector cells secreted high level of IFN-γ only when HLA-A2 molecule was present on the CD5⁺ cells (H9/HLA-A2, CCRF-CEM/HLA-A2, Jurkat/HLA-A2 and Molt14/HLA-A2), showing HLA restriction.

d) IFN-γ release by T-7378 transduced T cells against CD5⁻-HLA-A2⁺ after overnight co-culture at an effector to target ratio of 1:1. No IFN-γ was detected by ELISA, showing that T7378 induces CD5-dependent killing.

Figure 7:
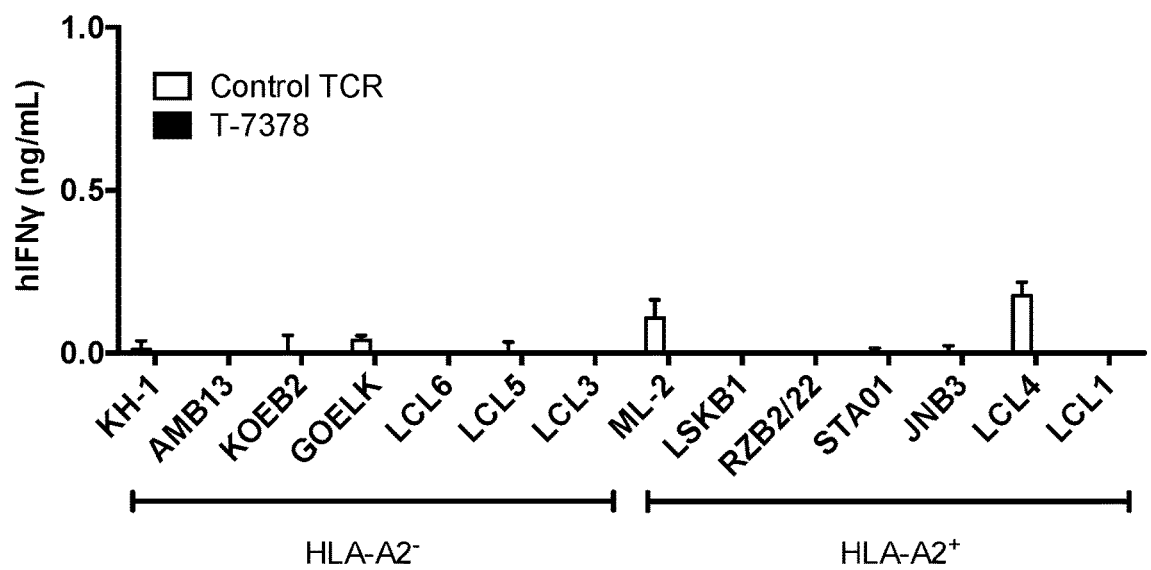

FIG. 7: Co-culture with a panel of LCLs to identify any potential alloreactivity of T-7378.

The T-7378-transduced T cells were co-cultured overnight with 14 different LCL lines with known HLA genotype to identify potential alloreactivity at an effector to target ratio of 1:1. The LCL lines do not express any CD5. No IFN-γ release by effector cells against any of the LCLs was detected, showing T-7378 does not have allo-reactive response to any of the HLA alleles covered by the LCL lines (Table 3).

Figure 8:
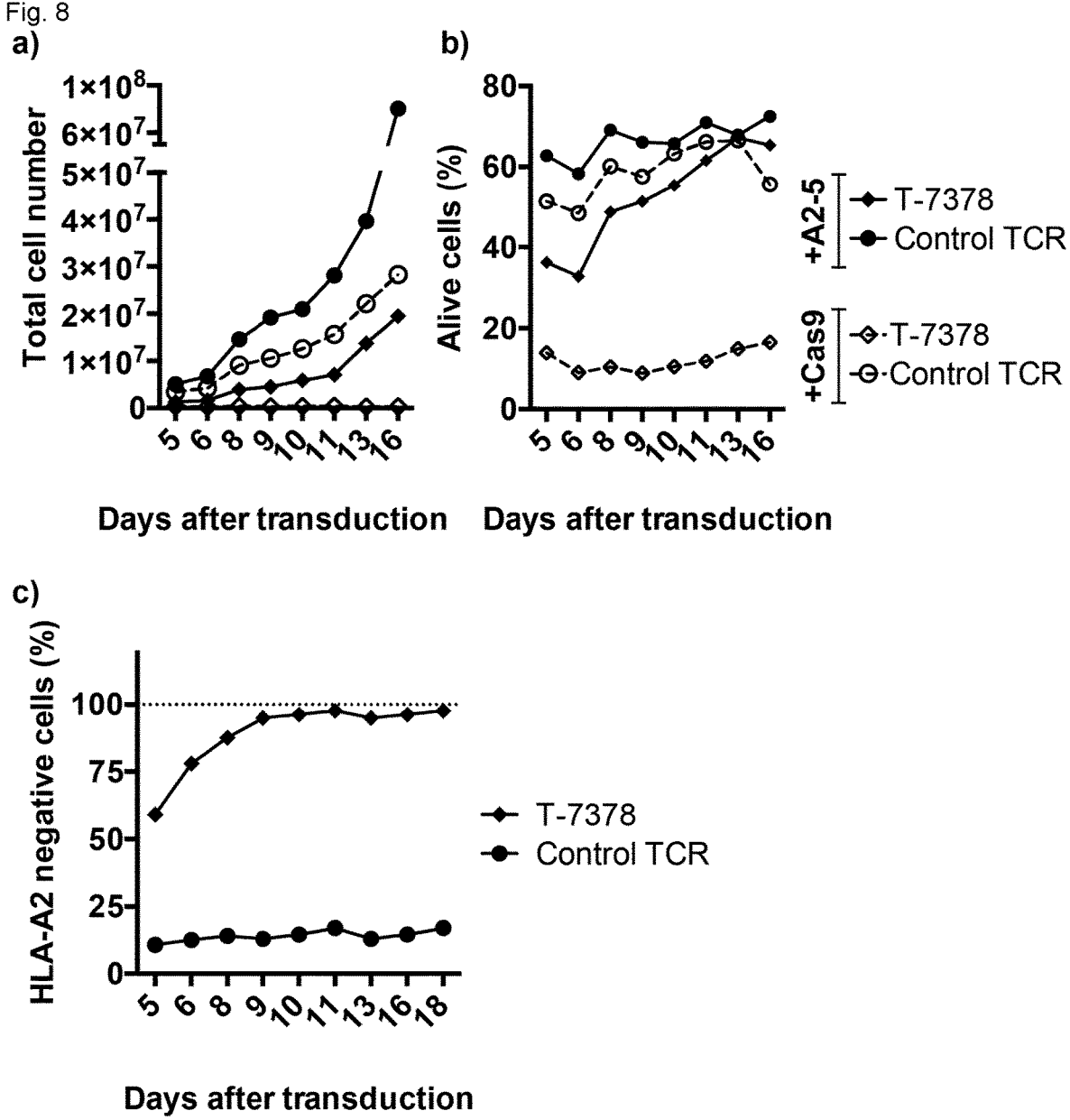

FIG. 8 HLA-KO in T-7378 TCR-transfected T cells

PBLs from HLA-A2⁺ blood donors were electroporated with RNP complexes targeting HLA-A2 genomic sequence and transduced with T-7378 TCR. Transduced cells were expanded for 18 days and counted to analyze cell expansion. Viability and fraction of HLA-A2-cells were analyzed by FACS on time points indicated on graphs.

A) The cells in expansion were counted and total number of cells in culture was calculated. T7378 transduced T cells that received A2-5 gRNA (diamond data point, solid line) expand comparable to PBLs transduced with control TCR receiving either A2-5 gRNA or only Cas9. On the other hand, Cas9 receiving T cells transduced with T-7378 TCR cannot expand due to fratricide (diamond data point, dashed line).

B) Prevention of fratricidal killing by HLA-A2 knock out has effect on the viability. The viability of T-7378 transduced T cells receiving A2-5 recovers in time (as they lose HLA-A2 on the surface) while Cas9 receiving cells do not change.

C) Fratricide induced selective pressure resulted in rapid increase in the fraction of HLA-A2 knock out cell in the population of T cells transduced with T-7378 but not control TCR.

SEQUENCES

SEQ ID NO: 1 epitope from CD5
SEQ ID NO: 2 T-20109+T-20332 alpha chain CDR1
SEQ ID NO: 3 T-20109+T-20332 alpha chain CDR2
SEQ ID NO: 4 T-20109+T-20332 alpha chain CDR3
SEQ ID NO: 5 T-20109+T-20332 beta chain CDR1
SEQ ID NO: 6 T-20109+T-20332 beta chain CDR2
SEQ ID NO: 7 beta chain CDR3 consensus sequence
SEQ ID NO: 8 T-20109 beta chain CDR3
SEQ ID NO: 9 T-20332 beta chain CDR3
SEQ ID NO: 10 variable region T-20109 alpha chain (aa)
SEQ ID NO: 11 variable region T-20109 beta chain (aa)
SEQ ID NO: 12 variable region T-20332 alpha chain (aa)
SEQ ID NO: 13 variable region T-20109 beta chain (aa)
SEQ ID NO: 14 variable region T-20109 alpha chain (na)
SEQ ID NO: 15 variable region T-20109 beta chain (na)
SEQ ID NO: 16 variable region T-20332 alpha chain (na)
SEQ ID NO: 17 variable region T-20332 beta chain (na)
SEQ ID NO: 18 murine constant region (alpha)
SEQ ID NO: 19 minimally murine constant region (alpha)
SEQ ID NO: 20 human constant region (alpha)
SEQ ID NO: 21 murine constant region (beta)
SEQ ID NO: 22 minimally murine constant region (beta)
SEQ ID NO: 23 human constant region (beta)
SEQ ID NO: 24 reverse primer for TCRA
SEQ ID NO: 25 reverse primer for TCRB
SEQ ID NO: 26 sequence from human CD5 (FIG. 1a)
SEQ ID NO: 27 sequence from mouse CD5 (FIG. 1a)
SEQ ID NO: 28 crRNA-spacer A2-1
SEQ ID NO: 29 crRNA-spacer A2-2
SEQ ID NO: 30 crRNA-spacer A2-3
SEQ ID NO: 31 crRNA-spacer A2-4
SEQ ID NO: 32 crRNA-spacer A2-5
SEQ ID NO: 33 epitope from CD5
SEQ ID NO: 34 T-7378 alpha chain CDR1
SEQ ID NO: 35 T-7378 alpha chain CDR2
SEQ ID NO: 36 T-7378 alpha chain CDR3
SEQ ID NO: 37 T-7378 beta chain CDR1

SEQ ID NO: 38 T-7378 beta chain CDR2
SEQ ID NO: 39 T-7378 beta chain CDR3
SEQ ID NO: 40 variable region T-7378 alpha chain (aa)
SEQ ID NO: 41 variable region T-7378 beta chain (aa)
SEQ ID NO: 42 variable region T-7378 alpha chain (na)
SEQ ID NO: 43 variable region T-7378 beta chain (na)
SEQ ID NO: 44 variable region T-7378 alpha chain (na), codon-optimized
SEQ ID NO: 45 variable region T-7378 beta chain (na), codon-optimized

EXAMPLES

1.1. Selection of Epitopes

Full length human CD5 protein sequence was obtained from NCBI database. The sequence was submitted to NetMHC V4 for prediction of epitopes binding to HLA-A2 allele. Epitope length was defined as 9-mers. The predicted epitopes with highest binding affinity and minimum homology to mouse CD5 were selected for immunization.

1.2. Immunization of ABabDII Mice

Figure 1:
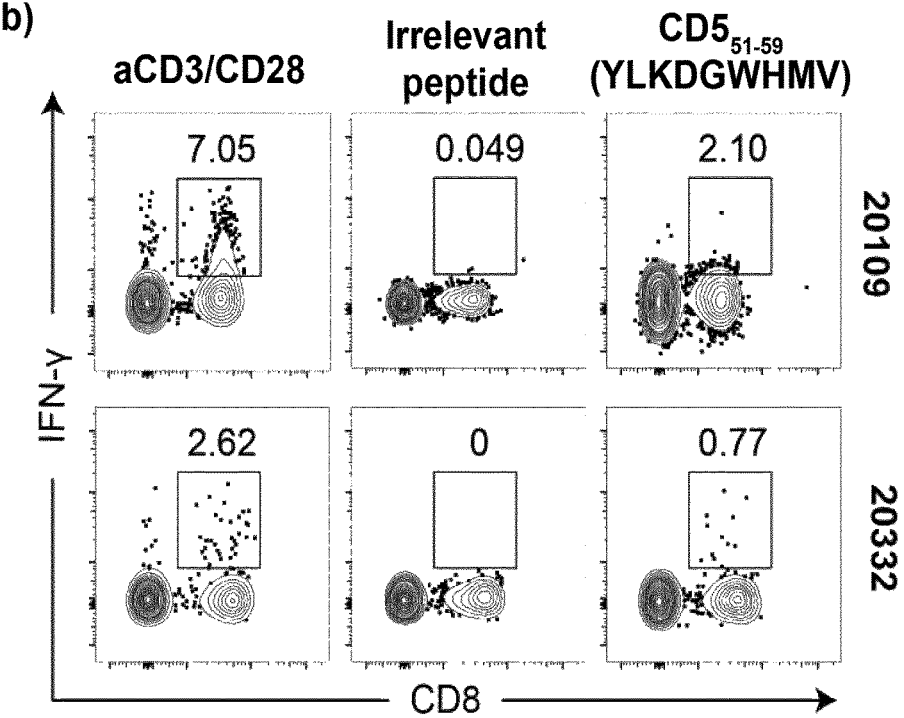
FIG. 1: Immunisation of ABabDII mice with the CD5 epitope, $CD5_{51-59}$ (YLKDGWHMV), SEQ ID NO: 1.
  a) Alignment of human CD5 (SEQ ID NO: 26) and mouse CD5 (SEQ ID NO: 27) sequences spanning the $CD5_{51-59}$ epitope that is underlined. The mouse sequences strongly differ with regard to the sequence corresponding to the epitope.
  b) Intracellular cytokine staining (ICS) of peripheral blood cells to detect IFN-γ secreting $CD8^+$-T cells after prime-boost immunization. Cells were stimulated with anti-CD3/CD28 antibodies as positive control (left panel). An irrelevant peptide was used as a negative control (middle panel).
  c) IFN-γ capture assay was done to detect and sort IFN-γ secreting $CD8^+$-T cells from in vitro-expanded splenocytes. Populations in the gates were sorted to isolate the RNA for identification of TCR variable chain rearrangements
  d) Identified TCR α and β pairs were used to construct a TCR cassette as shown.
Figure 1:
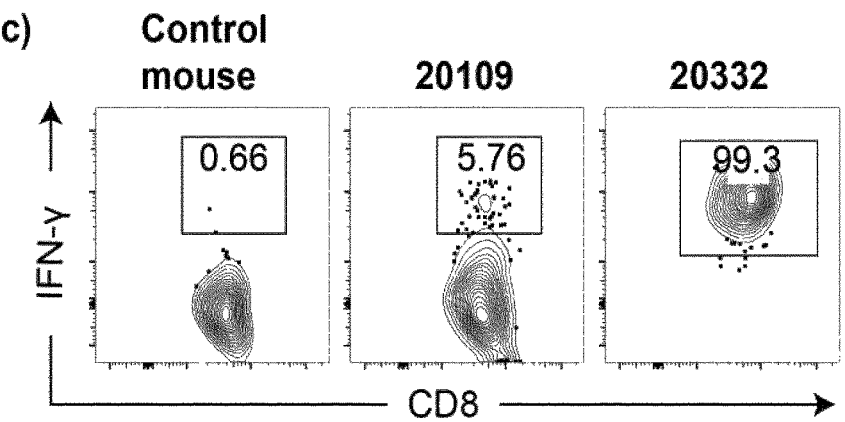
Figure 1:
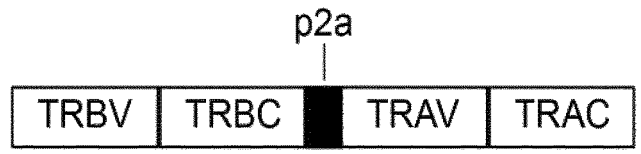

Predicted peptide (e.g., the peptide of SEQ ID NO: 1, as shown in FIG. 1a, or the peptide of SEQ ID NO: 33) was dissolved in appropriate solvent to a concentration of 2 mg/ml. Mice were primed on day 0 and immunized on day 21 with 100 µg of peptide in a 1:1 solution of incomplete Freund's adjuvant (IFA) and 50 µg CpG1826 by subcutaneous injection. Blood was collected 7 days after each boost and blood cells were cultured with $10^{-6}$ M peptide overnight in the presence of Brefeldin A (BFA). Peripheral response was analyzed by intracellular IFN-γ staining of blood cells after overnight culture (FIG. 1b).

Mice with IFN-γ-secreting CD8$^+$ T cells in the periphery were sacrificed. Spleen and inguinal lymph nodes of reactive mice were collected. CD4$^+$ T cells were depleted by CD4 microbeads (Miltenyi Biotech, Bergisch Gladbach, Germany). $1 \times 10^6$ splenocytes were seeded per well of a 24-well plate, and expanded for 10 days in RPMI 1640 medium supplemented with 10% FBS gold, HEPES, NEAA, Sodium Pyruvate, 50 µM β-mercaptoethanol, 20 IU/ml human IL-2 and $10^{-8}$ M peptide. Splenocytes were stimulated with $10^{-6}$ M peptide for 4 h before a mouse IFN-γ secretion assay (Miltenyi Biotech, Bergisch Gladbach, Germany). The cells were treated with Fc Block, stained with antibodies against mouse CD3-APC and mouse CD8-PerPC (BD Biosciences, San Jose, CA, USA). IFN-γ secreting CD8$^+$ T cells were sorted with BD FACSARIA™ III (BD Biosciences, San Jose, CA, USA) (FIG. 1c), and transferred to RTL lysis buffer for RNA isolation with RNEASY® Micro Kit (Qiagen, Hilden, Germany).

1.3. Identification and Cloning of TCRs

5'RACE-ready cDNA was synthesized with SMARTER® RACE kit (Clontech, CA, USA) according to instructions of the manufacturer. cDNA was diluted 1:3 prior to use. TCRA and TCRB variable chains were amplified by 5'RACE-PCR in a 50 µL reaction mix of 5 µL diluted cDNA, 2× Q5 Hot Start High-Fidelity master mix (New England Biosciences, Ipswich, MA, USA), 5 µL forward primer from the SMARTER® RACE kit (10× Universal Primer A Mix (UPM)) and 0.5 µM reverse primers for TCRA: 5'-CGGC-CACTTTCAGGAGGAGGATTCGGACC-3' (SEQ ID NO: 24) or TCRB:5'-CCGTAGAACTGGACTTGACAGCG-GAAGTGG-3' (SEQ ID NO: 25). Initial denaturation was done at 98° C. for 2 min seconds followed by 30 cycles of denaturation at 98° C. for 30 s, annealing at 72° C. for 30 s and elongation at 72° C. for 45 s. Annealing temperature was decreased by 2° C. at every 5 cycles for the first 10 cycles. Reaction was carried out for total 35 cycles. Final elongation was done at 72° C. for 5 min.

PCR products were separated on 2% gel. Bands corresponding to the correct size were eluted from the gel and cloned using ZERO BLUNT™ TOPO™ PCR Cloning Kit (Invitrogen) and sequenced with SP6 primer. Dominant TCR-α/β chains were selected and paired. The TCR constant regions were replaced with mouse counterparts. Paired TCR-α/β chains were linked with a p2A element (FIG. 1d). TCR cassette was codon optimized, synthesized by GENEART® (Thermo Fisher Scientific, Waltham, MA, USA) and cloned into pMP71 by restriction site cloning.

1.4. Generation of RNAi Vectors

Three different miRNA sequences 100% complementary to the HLA-A2 allele, i.e., crRNA sequences suitable for knocking out HLA-A2 by CRISPR/Cas9, were designed in silico (SEQ ID NO: 28, 29 and 30) and produced by overlap polymerase chain reaction (PCR) to introduce into the MP71-GFP vector as previously described (Bunse et al., 2014. Molecular Therapy 22(11):1983-1991). RNAi-TCR vectors were generated by swapping the TCR cassette with GFP by restriction enzyme cloning using cut sites NotI and EcoRI.

1.5. Formation of RNP Complexes crRNAs targeting HLA-A2 allele were predicted in silico with CRISPRGold (ttps://crisprgold.mdcberlin.de) and top five sequences with minimum off-target risks were selected (A2-1, A2-2, A2-.3, A2-3, A2-4 and A2-5), comprising, in this order, SEQ ID NO: 28-32. crRNAs and tracrRNAs were chemically synthesized (Dharmacon, IDT) and recombinant SpCas9 was obtained from the protein facility of MDC in in 20 mM HEPES-KOH pH 7.5, 150 mM KCl, 10% glycerol, 1 mM DTT. Lyophilized RNA was resuspended in the provided resuspension buffer to reach 100 µM concentration, aliquoted and stored at −20° C. crRNA and tracrRNA aliquots were thawed, mixed 1:1 by volume, annealed by incubation at 95° C. for 5 min and let cool down to RT on benchtop for 10 min. SpCas9, stored at 40 µM, was then mixed at 1:1 molar ratio with the gRNA at RT for 15 min to form an RNP at 20 µM. RNPs were electroporated immediately after complexing.

1.6. Electroporation of Human T Cells

PBMCs were isolated from fresh blood of HLA-A2*01 positive blood donors by Ficoll separation. T cells were MACS® sorted from the PBMCs using a pan T cell isolation kit (Miltenyi Biotech, Bergisch Gladbach, Germany). $1 \times 10^6$ isolated T cells were stimulated either on anti-CD3/anti-CD28 coated plates or with human T-activator CD2/CD28 DYNABEADS™ (Thermo Fisher Scientific) in RPMI 1640 medium supplemented with 10% FBS, HEPES, 100 IU/ml IL-2 in a 24-well plate. Cells were collected 48 hours after stimulation, resuspended in 20 µL Lonza P3 buffer per $1 \times 10^6$ cells and electroporated with 5 µL of RNP complex in the Amaxa 4D NUCLEOFECTOR® using the program EH110. Cells were incubated in RPMI 1640 medium supplemented with 10% FBS, HEPES, 100 IU/ml IL-2 in a 48-well plate for 24 hours before transduction.

1.7. TCR Re-Expression in Human PBLs

HEKT-GALV-g/p cells were transfected with 18 μg μMP71 vector carrying the TCR cassette with or without HLA-A2-targeting miRNA sequence. The virus supernatant was collected 48 h after transfection.

For RNAi mediated HLA-A2 knock down, the cells were collected and activated as described for electroporation and transduced 48h and 72h after activation with the TCR vectors carrying the miRNA sequences.

CRISPR/Cas9 mediated HLA-A2 edited cells were transduced with the vector carrying TCR cassette 48h and 72h after electroporation Transduction efficiency was determined by FACS staining for human HLA-A2-PE (BD Biosciences, San Jose, CA, USA), human CD8-APC (BD Biosciences, San Jose, CA, USA) and mouse TRBC-PerCP (Biolegend, San Diego, CA, USA).

TCR-transduced-T cells were expanded in T cell medium supplemented with 100 IU/ml IL-2 for 15 days and analysed per FACS every other day to measure HLA-A2, CD8, TCR expression and cell viability. A fraction of cells were frozen on day 8 to be used as effector cells for functional assays.

1.8. Functional Assays

1.8.1. Detection of Cytokine Release

For detection of cytokine release, $2 \times 10^4$ target cells and $2 \times 10^4$ TCR-transduced cells were seeded in 200 uL final volume in a 96-well format to reach 1:1 effector to target ratio. Cell-free supernatant was collected after overnight incubation to detect IFN-γ secretion by ELISA.

1.8.2 Detection of T Cell Activation

Cells were collected for further analysis and stained with antibodies against human CD137-PE (BD Biosciences, San Jose, CA, USA), human CD8-APC-H7 (BD Biosciences, San Jose, CA, USA), mouse TRBC-APC (Biolegend, San Diego, CA, USA) and run on BD FACSCANTO™ II Flow cytometer. Data was analyzed with FLOWJO™ version 10.0.8.

Figure 2:
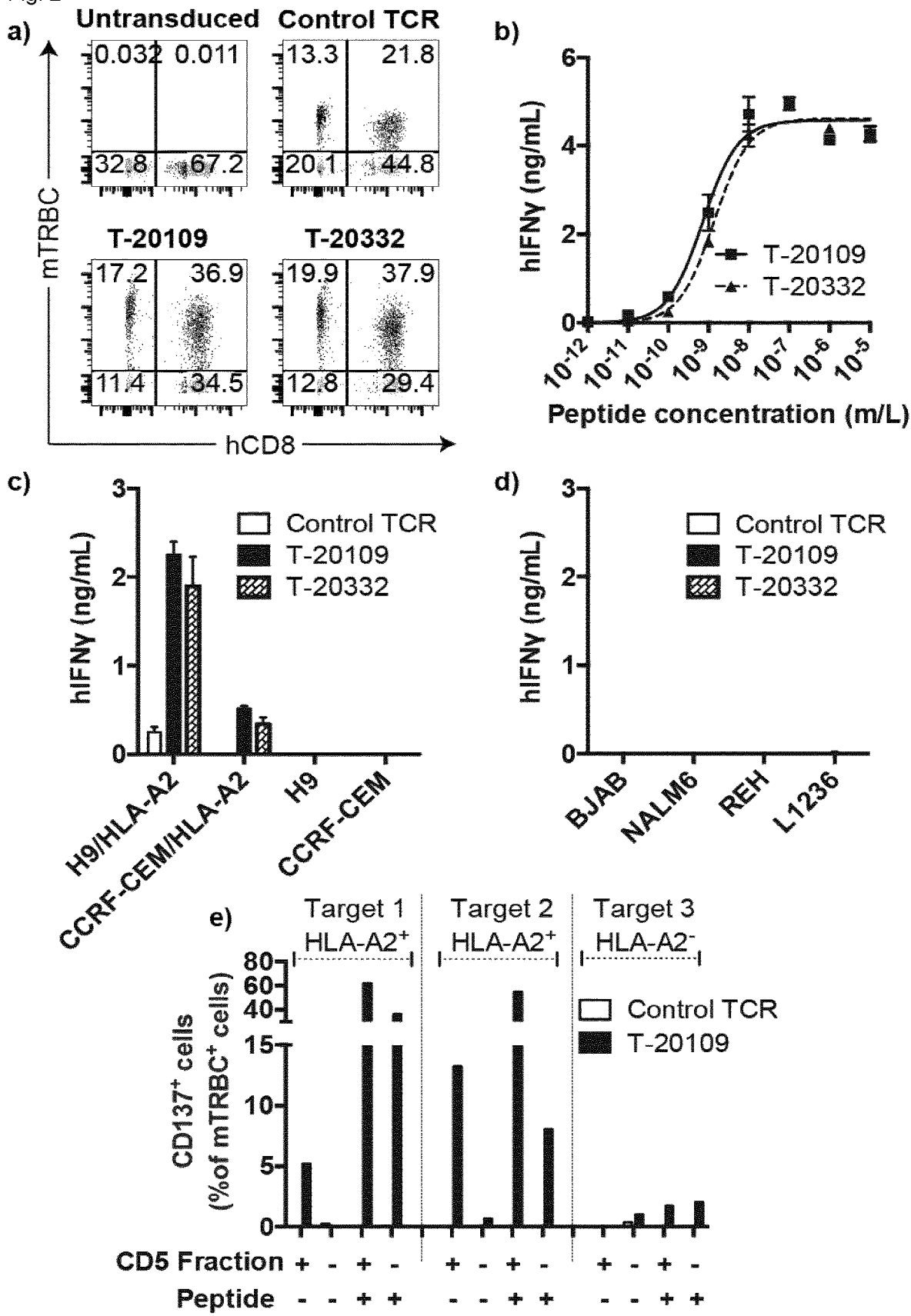
FIG. 2: Re-expression of identified TCRs in HLA-A2⁻ human peripheral blood lymphocytes
  a) FACS analysis of HLA-A2⁻ human peripheral blood lymphocytes (hPBLs) after transduction with T-20109 and T-20332 TCRs. The transduction rate varied between 30-80% depending on the virus titer.
  b) Co-culture with T2 cells loaded with decreasing concentration of YLK peptide (SEQ ID NO: 1) to deduce TCR affinity. A representative of peptide titration is shown here.
  c) IFN-γ release by effector cells against $CD5^+$-$HLA$-$A2^+$ target cells. Effector cells secreted IFNγ only when HLA-A2 molecule was present on the $CD5^+$ cells (H9/HLA-A2 and CCRF-CEM/HLA-A2), showing HLA restriction.
  d) IFN-γ release by effector cells against $CD5^+$-$HLA$-$A2^-$. We did not detect any IFN-γ by ELISA, showing HLA-A2 dependency of killing.
  e) Recognition of primary cells from blood donors by T-20109. Only $CD5^+$ fraction of HLA-A2+ donors induced CD137 upregulation on TCR transduced effector cells indicating T20109 TCR can recognize primary T cells isolated from human blood.

2. Results a) TCR recognizing the $CD5_{51-59}$ epitope (SEQ ID NO: 1) were isolated, T-20109 and T-20332. Both TCR share the CDRs of the alpha chain, but, interestingly, differ in the CDR3 region of the beta chain. FIG. 2a shows FACS analysis of HLA-A2⁻ human peripheral blood lymphocytes (hPBLs) after transduction with T-20109 and T-20332 TCRs. The transduction rate varied between 30-80% depending on the virus titer.

T2 cells were loaded with serial dilutions of peptide at $10^{-5}$ M to $10^{-12}$ M for peptide titration experiments (FIG. 2b). T-20109 and T-20332 both have a high peptide sensitivity, with T20109 reacting at slightly lower peptide concentrations.

For experiments with FACS analysis, target cells were selected based on their CD5 expression and labeled with 1 μM CFSE (ab113853, Abcam, Cambridge, UK) prior to seeding to differentiate them from effector cells.

H9 cells and CCRF-CEM cells express CD5. The TCR-transduced cells were tested for cytokine release after overnight incubation with these cells lines which had either been engineered to express HLA-A2 or not (FIG. 2c), showing HLA restriction of both TCR constructs. A corresponding analysis with other CD5⁺ HLA-A2-cells as target cells confirmed HLA restriction (FIG. 2d).

For co-culture with primary human cells as targets, PBMCs were isolated from HLA-A2 positive and negative blood donors. To obtain a CD5 positive fraction, cells were stained with CD5-APC antibody, labeled with anti-APC magnetic beads and MACS® sorted. MACS®-sorted CD19 positive cells served as the CD5 negative fraction. T cell activation was tested after overnight incubation with or without peptide (1 μM/L).

FIG. 2e shows, for T-20109 and a control TCR not reactive with CD5, that T-cells expressing said TCR are activated by CD5-positive cells if these cells also express HLA-A2. Activation, in particular by HLA-A2-positive cells, is also induced—or increased—by addition of peptide.

b) A TCR recognizing the $CD5_{283-291}$ epitope (SEQ ID NO: 33) were isolated, T-7378. FIG. 6a shows FACS analysis of HLA-A2⁻ human peripheral blood lymphocytes (hPBLs) after transduction with T-7378 TCR. The transduction rate varied between 20-80% depending on the virus titer.

T2 cells were loaded with serial dilutions of peptide of SEQ ID NO: 33 at $10^{-5}$ M to $10^{-12}$ M for peptide titration experiments (FIG. 6b).

For experiments with FACS analysis, target cells were selected based on their CD5 expression and labeled with 1 μM CFSE (ab113853, Abcam, Cambridge, UK) prior to seeding to differentiate them from effector cells.

H9 cells and CCRF-CEM cells express CD5. The TCR-transduced cells were tested for cytokine release after overnight incubation with these cells lines which had either been engineered to express HLA-A2 or not (FIG. 6c), showing HLA restriction of both TCR constructs. A corresponding analysis with other CD5⁺ HLA-A2-cells as target cells confirmed HLA restriction (FIG. 6d).

Further, to test for a potential alloreactivity of T-7378, T-7378 transduced effector cells were co-cultured with 14 different LCL lines with known HLA genotype (Table 3). The LCL lines do not express any CD5. No IFN-γ release by effector cells against any of the LCLs was detected, showing T-7378 does not have allo-reactive response to any of the HLA alleles covered by the LCL lines. T-7378 can thus be safely used in patients having a large variety of HLA-genotypes, e.g., those tested.

TABLE 3

| List of the LCLs and their MHC Class I alleles. | | | | |
|---|---|---|---|---|
| | HLA-A | | HLA-B | HLA-C |
| LCL1 | A*02 | A*26 | B*13 | B*27 |
| LCL2 | A*32 | A*68 | B*44 | |
| LCL3 | A*01 | A*31 | B*08 | B*40:02 |
| LCL4 | A*02 | A*24 | B*15 | |
| LCL5 | A*24 | | B*08 | B*51 |

TABLE 3-continued

List of the LCLs and their MHC Class I alleles.

| | HLA-A | | HLA-B | | HLA-C | |
|---|---|---|---|---|---|---|
| LCL6 | A*01 | | B*08 | | | |
| GOELK | A*11 | A*24 | B*13 | B*38 | C*05:01:01 | C*12:03:01 |
| MDB1 | A*01 | A*11 | B*08 | B*15 | | |
| FSB1 | A*24 | A*26 | B*07 | B*38 | | |
| JNB3 | A*01 | A*02:01 | B*07 | B*40:01 | | |
| STA01 | A*02:01 | A*02:01 | B*07:02 | B*15:01 | | |
| RZB2/22 | A*02:01 | A*29:01 | B*44:02 | B*45:01 | C*06:02 | |
| KOEB2 | A*01 | A*29 | B*44 | B*51 | | |
| LSKB1 | A*01 | A*02 | B*07 | B*08 | C*07 | C*07 |
| AMB13 | A*01 | A*26 | B*35:01 | B*57:01 | | |
| KH1 | A*01 | A*03 | B*07 | B*08 | | |
| ML | A*02 | A*23 | B40:01 | B*44 | | |

Figure 3:
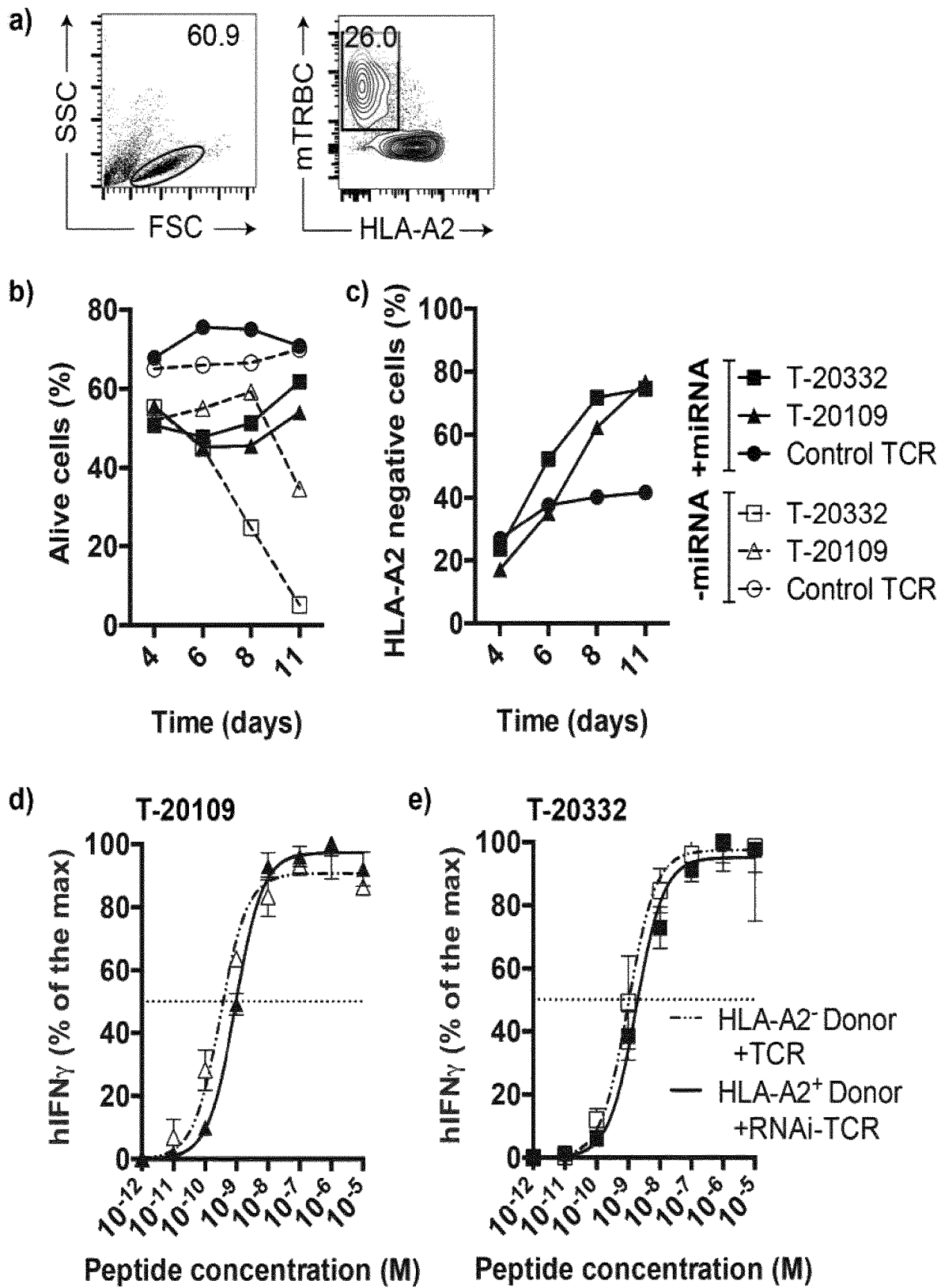
FIG. 3: HLA-A2 downregulation by RNAi on TCR-transduced $HLA$-$A2^+$ hPBLs.
  a) hPBLs were isolated from $HLA$-$A2^+$ blood donors and transduced with vectors carrying CD5 TCRs with or without the HLA-A2 targeting miRNA sequences. Transduced T cells were expanded for 11 days following transduction. Both viability (DAPI-negative cells) and fraction of HLA-A2⁻ cells were analyzed by FACS every other day.
  b) Percentage of alive cells for T cells transduced with CD5 TCRs decreased in time due to fratricide (dashed lines). Introduction of HLA-A2-targeting miRNA sequence (RNAi-T20109 and RNAi-T-20332) to the vector rescued the viability of the after day 8.
  c) HLA-A2⁻ cells expanded in culture over time due to the selective pressure applied by the fratricide. The percentage of HLA-A2⁻ cells remained the same when the cells received RNAi and a control TCR.
  d, e) RNAi-CD5 TCR transduced T cells from $HLA$-$A2^+$ donors were co-cultured with peptide loaded T2 cells to assess any changes in TCR-affinity due to introduction of HLA-A2 targeting miRNA. HLA-A2⁻-TCR-transduced T cells served as a control (dashed lines). The Kd values increased by 2.24 and 1.48-fold for T-20109 (d) and T-20332 (e), respectively, indicating slight but non-significant decrease in TCR affinities to μMHC complex.

2.1 RNAi Downregulation of CD5 hPBLs were isolated from HLA-A2+ blood donors and transduced with vectors carrying CD5 TCRs with or without the HLA-A2 targeting miRNA sequences (FIGS. 3a and 8a). The percentage of living T cells transduced with CD5 TCR decreased in time due to fratricide. Introduction of HLA-A2-targeting miRNA sequence (RNAi-T-20109 and RNAi-T-20332) to the vector rescued the viability of the after day 8 (FIGS. 3b and 8b), and the percentage of HLA-A2-negative cells increased due to the selective pressure (FIGS. 3c and 8c). No significant decrease in peptide sensitivity or affinity of the TCRs was seen due to introduction of the miRNA (FIG. 3d).

2.2 CRISPR/Cas-Mediated Downregulation of CD5

Figure 4:
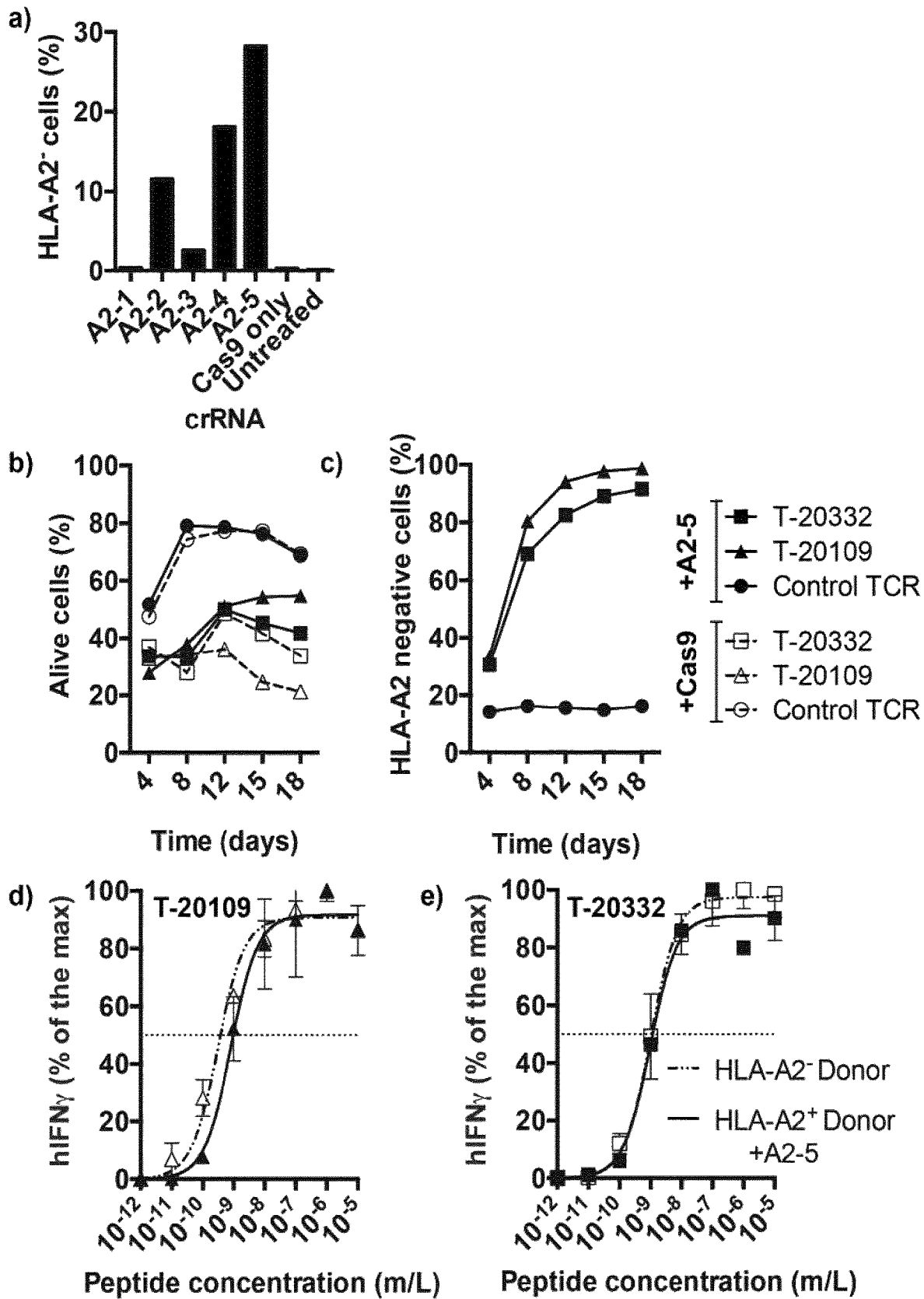
FIG. 4: CRISPR/Cas9 mediated HLA-A2-editing on TCR-transduced T cells.
  hPBLs were isolated from $HLA$-$A2^+$ blood donors, electroporated with RNP complexes targeting HLA-A2 genomic sequence and transduced with T-20109 and T-20332 TCRs. Transduced T cells were expanded for 18 days following transduction. Viability and fraction of HLA-A2⁻ cells were analyzed by FACS every other day.
  a) hPBLs from $HLA$-$A2^+$ blood donors were electroporated with RNP complexes targeting HLA-A2 genomic sequence. HLA-A2 expression on the surface was analyzed by FACS 72h after electroporation. crRNA A2-5 yielded highest KO efficiency, therefore, was selected for downstream experiments.
  b) Electroporation was coupled to transduction with T-20109 or T-20332 TCRs. The viability of cells transduced with T-20109 and receiving A2-5 RNPs (triangle data points, solid line) recovered slightly after d8, while the ones receiving Cas9 only (triangle data points, dashed line) had decreasing viability in time.

FIG. 4a shows that some of the crRNA constructs selected, in particular, A2-2, A2-4 and A2-5, were able to reduce HLA-A2 expression on the surface of hPBLs. crRNA A2-5 (comprising SEQ ID NO: 32) yielded highest KO efficiency, therefore, it is preferred and was selected for downstream experiments.

hPBLs were isolated from HLA-A2+ blood donors, electroporated with RNP complexes targeting HLA-A2 genomic sequence or Cas9 only and transduced with T-20109 and T-20332 TCRs. The viability of T cells transduced with aCD5 TCR together with A2-5 after d8 was higher than the viability of T cells transduced with aCD5 TCR and Cas9 only, in particular for T-20109 (FIG. 4b). The percentage of HLA-A2-negative cells increased due to the selective pressure (FIG. 4c). No significant decrease in peptide sensitivity or affinity of the TCRs was seen due to reduced expression of HLA-A2 (FIG. 4d).

FIG. 5 compares T cell activation of T cells expressing T-20109 and T-20332 which either were from an HLAA2-negative donor or wherein HLA-A2 had been downregulated by miRNA or the CRISPR-based approach. All TCR-transgenic T cells only recognized the HLA-A2 positive target cells.

The invention claimed is:

1. A nucleic acid encoding a TCR alpha chain construct (TRA) comprising a CDR1 having SEQ ID NO: 34, a CDR2 having SEQ ID NO: 35 and a CDR3 having SEQ ID NO: 36 and a TCR beta chain construct (TRB) comprising of a CDR1 having SEQ ID NO: 37, a CDR2 having SEQ ID NO: 38 and a CDR3 having SEQ ID NO: 39;

wherein the TCR alpha chain construct and the TCR beta chain construct are encoded on the same or different nucleic acids; and wherein the TRA and TRB form a TCR construct specific for an epitope in complex with a human MHC I molecule, wherein the epitope is an epitope from human CD5; wherein the MHC I is HLA-A*02 and the epitope is SEQ ID NO: 33.

2. The nucleic acid of claim 1, wherein, the TRA has a variable region having at least 70% sequence identity to SEQ ID NO: 40 and/or the TRB has a variable region having at least 70% sequence identity to SEQ ID NO: 41.

3. The nucleic acid of claim 1, wherein, the nucleic acid encoding the TRA has at least 80% sequence identity to SEQ ID NO: 42 and/or the nucleic acid encoding the TRB has at least 80% sequence identity to SEQ ID NO: 43.

4. The nucleic acid of claim 1, encoding a TCR alpha and beta chain construct of the TCR construct, wherein the TCR alpha chain construct and the TCR beta chain construct further comprise a constant region selected from the group consisting of a human constant region, a murine constant region and a chimeric constant region.

5. The nucleic acid of claim 1, which is selected from the group consisting of a viral vector, a transposon or a vector suitable for CRISPR/CAS based recombination.

6. A protein encoded by the nucleic acid of claim 1.

7. A host cell comprising the protein of claim 6.

8. A pharmaceutical composition comprising the protein of claim 6 comprising a TCR construct capable of specifically binding to a peptide of SEQ ID NO: 33 in the context of HLA-A*02.

9. A composition or kit comprising the nucleic acid of claim 1 and an agent for inhibiting expression of HLA-A*02 selected from the group consisting of silencing RNA, siRNA, shRNA, miRNA, a nucleic acid encoding a silencing RNA, siRNA, shRNA, miRNA, a ribonucleoprotein complex comprising CRISPR and a guide RNA suitable for targeting CRISPR to suppress HLA-A*02 expression, a Transcription Activator-like Effector Nuclease suitable for suppressing HLA-A*02 expression, and a Zincfinger nuclease suitable for suppressing HLA-A*02 expression, wherein, if the miRNA is encoded by a nucleic acid, said nucleic acid can be on the same nucleic acid as the nucleic acid of claim 1.

10. A pharmaceutical composition comprising the composition or kit of claim 9.

11. A composition or kit comprising the nucleic acid of claim 1 and an agent for inhibiting expression of CD5 selected from the group consisting of silencing RNA, siRNA, shRNA, miRNA or a nucleic acid encoding a silencing RNA, siRNA, shRNA, miRNA, or a ribonucleoprotein complex comprising CRISPR and a guide RNA suitable for targeting CRISPR to suppress CD5 expression, a Transcription Activator-like Effector Nuclease suitable for suppressing CD5 expression, and a Zincfinger nuclease suitable for suppressing CD5 expression, wherein, if the miRNA is encoded by a nucleic acid, said nucleic acid can be on the same nucleic acid as the nucleic acid encoding the TCR alpha chain construct (TRA) and/or a TCR beta chain construct (TRB).

12. A host cell comprising the nucleic acid of claim 1.

13. The host cell of claim 12, wherein the host cell does not express HLA-A*02 or comprises an agent for inhibiting expression of HLA-A*02 selected from the group comprising silencing RNA, siRNA, shRNA, miRNA or a nucleic acid encoding a silencing RNA, siRNA, shRNA, miRNA, or a ribonucleoprotein complex comprising CRISPR and a guide RNA suitable for targeting CRISPR to suppress HLA-A*02 expression.

14. The host cell of claim 12, wherein the host cell does not express CD5 or comprises an agent for inhibiting expression of CD5 selected from the group comprising silencing RNA, siRNA, shRNA, miRNA or a nucleic acid encoding a silencing RNA, siRNA, shRNA, miRNA, a ribonucleoprotein complex comprising CRISPR and a guide RNA suitable for targeting CRISPR to suppress CD5 expression.

15. The host cell of claim 12 expressing a TCR construct capable of specifically binding to a peptide of SEQ ID NO: 33 in the context of HLA-A*02; wherein the host cell does not express HLA-A*02 or comprises an agent for inhibiting expression of HLA-A*02 selected from the group consisting of silencing RNA, siRNA, shRNA, miRNA or a nucleic acid encoding a silencing RNA, siRNA, shRNA, miRNA, or a ribonucleoprotein complex comprising CRISPR and a guide RNA suitable for targeting CRISPR to suppress HLA-A*02 expression; and/or wherein the host cell does not express CD5 or comprises an agent for inhibiting expression of CD5 selected from the group consisting of silencing RNA, siRNA, shRNA, miRNA or a nucleic acid encoding a silencing RNA, siRNA, shRNA, miRNA, a ribonucleoprotein complex comprising CRISPR and a guide RNA suitable for targeting CRISPR to suppress CD5 expression.

16. A pharmaceutical composition comprising the nucleic acid of claim 1 encoding a TCR construct capable of specifically binding to a peptide of SEQ ID NO: 33 in the context of HLA-A*02.

17. A method of treating a patient having a T cell lymphoma or T cell leukemia, wherein the patient expresses HLA-A*02 comprising administering the pharmaceutical composition of claim 16 to said patient.

18. A nucleic acid encoding a TCR alpha chain construct (TRA) comprising a CDR1 having SEQ ID NO: 2, a CDR2 having SEQ ID NO: 3 and a CDR3 having SEQ ID NO: 4; and a TCR beta chain construct (TRB) comprising a CDR1 having SEQ ID NO: 5, a CDR2 having SEQ ID NO: 6 and a CDR3 having SEQ ID NO: 8 wherein the TCR alpha chain construct and the TCR beta chain construct are encoded on the same or different nucleic acids; and wherein the TRA and TRB form a TCR construct specific for an epitope in complex with a human MHC I molecule, wherein the epitope is an epitope from human CD5 wherein the MHC I is HLA-A*02 and the epitope is SEQ ID NO: 1.

19. The nucleic acid of claim 18 wherein, the TRA has a variable region having at least 70% sequence identity to SEQ ID NO: 10 and/or the TRB has a variable region having at least 70% sequence identity to SEQ ID NO: 11.

20. The nucleic acid of claim 18, wherein the TRB comprises a CDR3 having SEQ ID NO: 8,
wherein the TRA has a variable region having at least 80% sequence identity to SEQ ID NO: 10 and/or the TRB has a variable region having at least 80% sequence identity to SEQ ID NO: 11.

21. A nucleic acid encoding a TCR alpha chain construct (TRA) comprising a CDR1 having SEQ ID NO: 2, a CDR2 having SEQ ID NO: 3, and a CDR3 having SEQ ID NO: 4; and a TCR beta chain construct (TRB) comprising a CDR1 having SEQ ID NO: 5, a CDR2 having SEQ ID NO: 6 and a CDR3 having SEQ ID NO: 9, wherein the TRA and TRB form a TCR construct specific for an epitope in complex with a human MHC I molecule, wherein the epitope is an epitope from human CD5 wherein the MHC I is HLA-A*02 and the epitope is SEQ ID NO: 1, and wherein the TRA has a variable region having at least 80% sequence identity to SEQ ID NO: 12 and/or the TRB has a variable region having at least 80% sequence identity to SEQ ID NO: 13.

* * * * *